United States Patent
Holm et al.

(10) Patent No.: US 10,332,521 B2
(45) Date of Patent: *Jun. 25, 2019

(54) TRANSCRIPTION PRESENTATION OF COMMUNICATION SESSIONS

(71) Applicants: Michael Holm, Bountiful, UT (US); Jasper C. Pan, Draper, UT (US)

(72) Inventors: Michael Holm, Bountiful, UT (US); Jasper C. Pan, Draper, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/782,719

(22) Filed: Oct. 12, 2017

(65) Prior Publication Data

US 2018/0102129 A1    Apr. 12, 2018

(51) Int. Cl.
*G10L 15/26* (2006.01)
*G10L 15/01* (2013.01)
(Continued)

(52) U.S. Cl.
CPC .............. *G10L 15/26* (2013.01); *G10L 15/01* (2013.01); *G10L 15/18* (2013.01); *G10L 15/265* (2013.01);
(Continued)

(58) Field of Classification Search
None
See application file for complete search history.

(56) References Cited

U.S. PATENT DOCUMENTS 6,513,003 B1    1/2003   Angell et al.
7,881,441 B2    2/2011   Engelke et al.
(Continued)

FOREIGN PATENT DOCUMENTS

CN    104850180 A    8/2015
DE    102010030224 A1    12/2011
EP    3076687 A1    10/2016

OTHER PUBLICATIONS

Fasbender et al., Phone-controlled Delivery of NGN Services into Residential Environments, The Second International Conference on Next Generation Mobile Applications, Services, and Technologies, IEEE Xplore, Sep. 2008.
(Continued)

*Primary Examiner* — Maria El-Zoobi
(74) *Attorney, Agent, or Firm* — Maschoff Brennan

(57) ABSTRACT

A method may include obtaining information from multiple local devices. The information may indicate a configuration of each of the multiple of local devices with respect to a capability to: receive and broadcast remote audio and display transcriptions of the remote audio. The method may also include establishing a communication session with a remote device and after establishing the communication session with the remote device, obtaining the remote audio from the remote device. The method may further include directing the remote audio to a first local device of the multiple local devices based on the first local device being configured to receive and broadcast remote audio. The method may also include directing transcript data that includes a transcription of the remote audio to a second local device of the multiple local devices based on the second local device being configured to display transcriptions of the remote device audio.

20 Claims, 11 Drawing Sheets

(51) Int. Cl.
   *G10L 15/18*   (2013.01)
   *G10L 15/30*   (2013.01)
   *H04M 3/42*    (2006.01)
   *H04M 1/247*   (2006.01)
   *H04M 1/253*   (2006.01)
   *G10L 15/28*   (2013.01)
   *H04M 1/725*   (2006.01)

(52) U.S. Cl.
   CPC .............. *G10L 15/28* (2013.01); *G10L 15/30* (2013.01); *H04M 1/2473* (2013.01); *H04M 1/2475* (2013.01); *H04M 1/2535* (2013.01); *H04M 3/42221* (2013.01); *H04M 3/42391* (2013.01); *H04M 1/7253* (2013.01); *H04M 2201/40* (2013.01); *H04M 2201/60* (2013.01)

(56) References Cited

U.S. PATENT DOCUMENTS

| | | |
|---|---|---|
| 8,270,358 B2 | 8/2012 | Emond et al. |
| 8,265,240 B2 | 9/2012 | Langgood et al. |
| 8,316,237 B1 | 11/2012 | Felsher et al. |
| 8,390,670 B1 | 3/2013 | Gottlieb |
| 8,416,925 B2 | 4/2013 | Engelke et al. |
| 8,917,821 B2 | 12/2014 | Engelke et al. |
| 8,990,406 B2 | 3/2015 | Doss et al. |
| 9,455,947 B2 | 9/2016 | Park et al. |
| 2004/0132426 A1 | 7/2004 | Baiker |
| 2005/0063409 A1 | 3/2005 | Oommen |
| 2006/0095259 A1 | 5/2006 | Bahl et al. |
| 2006/0242589 A1 | 10/2006 | Cooper et al. |
| 2007/0142024 A1 | 6/2007 | Clayton et al. |
| 2011/0194506 A1 | 8/2011 | Hirsch et al. |
| 2012/0185250 A1 | 7/2012 | Beach et al. |
| 2012/0268553 A1* | 10/2012 | Talukder ............. H04L 12/1818 |
| | | 348/14.08 |
| 2013/0309971 A1 | 11/2013 | Kiukkonen et al. |
| 2015/0234762 A1 | 8/2015 | Townsend |
| 2016/0028869 A1 | 1/2016 | Bhatt |
| 2016/0112096 A1 | 4/2016 | Zhao et al. |
| 2016/0278143 A1* | 9/2016 | Akhtar Masoom Akhtar ............ |
| | | H04W 76/14 |
| 2017/0251150 A1* | 8/2017 | Roylance ............... H04N 5/278 |

OTHER PUBLICATIONS

International Search Report and Written Opinion, as issued in connection with International Patent Application No. PCT/US17/56401, dated Jan. 8, 2018.

* cited by examiner

TRANSCRIPTION PRESENTATION OF COMMUNICATION SESSIONS

CROSS-REFERENCE TO RELATED APPLICATIONS

This patent application claims the benefit of U.S. Provisional Patent Application No. 62/407,302, entitled "END-POINT NETWORK ENABLED COMMUNICATION SESSIONS" filed on Oct. 12, 2016, which is incorporated herein by reference in its entirety.

FIELD

The embodiments discussed herein are related to presentation of transcriptions in communication sessions.

BACKGROUND

Modern telecommunication services provide features to assist those who are deaf or hearing-impaired. One such feature is a telephone system for the hearing impaired that obtains transcriptions of audio from conversations that occur using the telephone system from a captioning provider. A captioning provider may be a telecommunication service that helps permit a hearing-impaired user to utilize a normal telephone network.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to provide transcripts of a communication is provided. The method may include obtaining information from multiple local devices. The information may indicate a configuration of each of the multiple of local devices with respect to a capability to: receive and broadcast remote audio and display transcriptions of the remote audio. The method may also include establishing a communication session with a remote device and after establishing the communication session with the remote device, obtaining the remote audio from the remote device. The method may further include directing the remote audio to a first local device of the multiple local devices based on the first local device being configured to receive and broadcast remote audio. The method may also include directing transcript data that includes a transcription of the remote audio to a second local device of the multiple local devices based on the second local device being configured to display transcriptions of the remote device audio.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to a method and/or system that may transcribe communication sessions between multiple devices. In some embodiments, the method and/or system describe that a communication session between a remote device and a device selected from multiple devices may be directed by a host device that handles the communication protocols between the selected device and the remote device. In these and other embodiments, the selected device may receive audio from the remote device and the audio may be provided to a transcription system.

The transcription system may be configured to transcribe the audio and a transcript may be provided to the selected device or another device of the multiple devices for presentation to a hearing-impaired user. The transcript may assist the hearing-impaired user in understanding the audio and participate better in the communication session.

Thus, the method and/or system may be configured to facilitate an assisted call with a hearing-impaired user. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others. Thus, the system described may be an assistive service that may assist a hearing-impaired user to utilize a communication network and assist the hearing impaired user's understanding of a conversation by providing transcriptions to supplement voice conversation occurring during communication sessions that involve the hearing-impaired user.

In some embodiments, the communication session may be multiplexed so that each of the multiple devices may receive audio from the remote device. In these and other embodiments, the transcription may be provided to each of the multiple devices for presentation by the multiple devices. Alternatively or additionally, each of the multiple devices may provide audio to the remote device during the communication session.

The systems and/or methods described in this disclosure may assist in enabling the generation of a transcription of audio of multiple devices participating in a communication session with another device in place of the transcription of audio in only point-to-point communication sessions. Thus, the systems and/or methods provide at least a technical solution to a technical problem associated with the design of current transcription systems.

Figure 1:
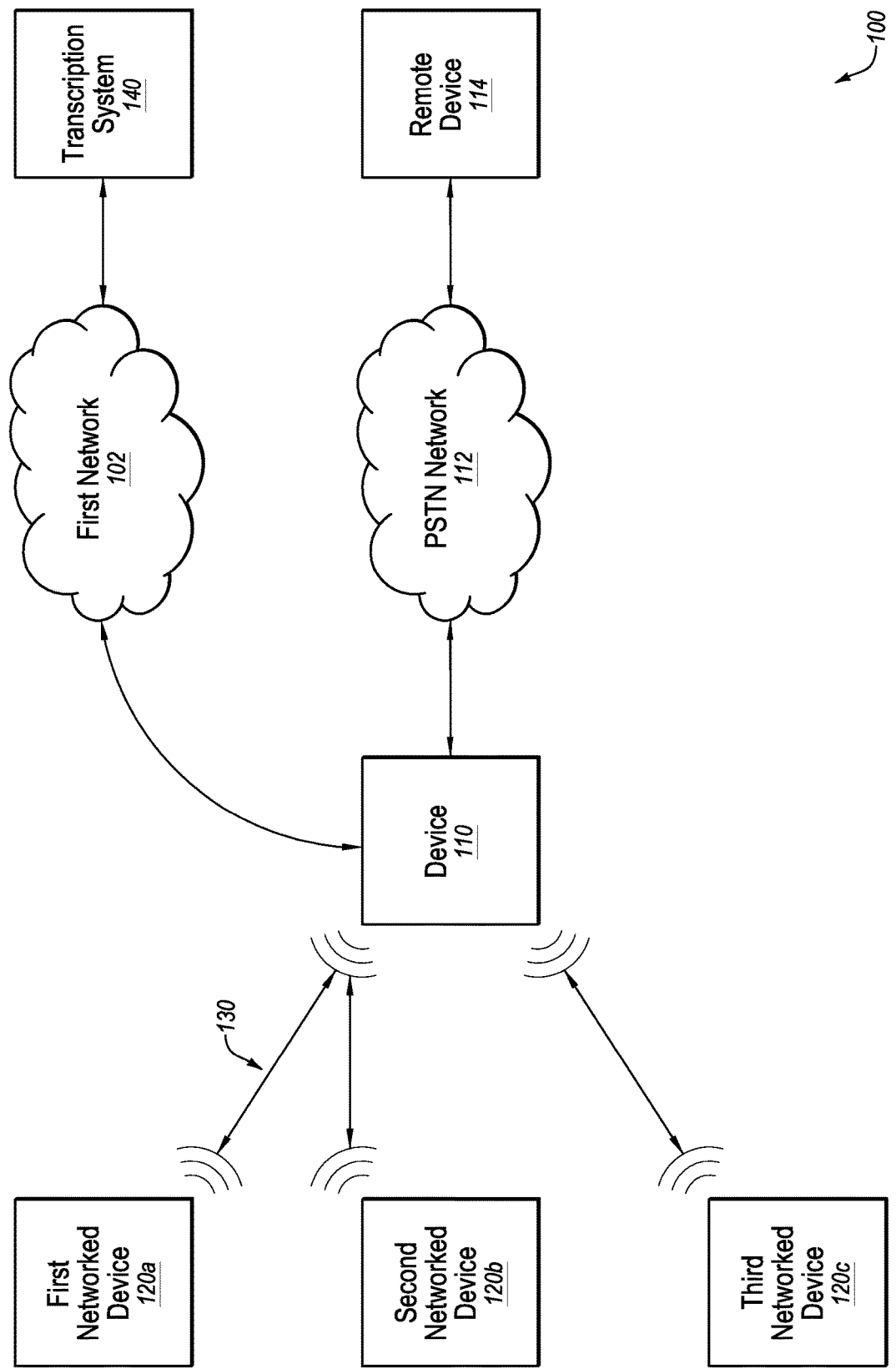
FIG. 1 illustrates an example environment for communication sessions that include presentations of transcriptions of the communication sessions.

Turning to the figures, FIG. 1 illustrates an example environment 100 for communication sessions that include presentations of transcriptions of the communication sessions. The environment 100 may be arranged in accordance with at least one embodiment described in the present disclosure. The environment 100 may include a first network 102, a device 110, a public switched telephone network (PSTN) 112, a remote device 114, a first networked device 120a, a second networked device 120b, a third networked device 120c, a second network 130, and a transcription system 140.

The device 110 may be a digital device that is configured to establish, maintain, and/or terminate communication sessions over various networks between various types of devices. In some embodiments, the device 110 may be configured to multiplex communications among multiple devices. In these and other embodiments, the device 110 may be configured to establish, maintain, and/or terminate a communication session between the remote device 114 and one or more of the first networked device 120a, the second networked device 120b, and the third networked device 120c (referred to as the networked device(s) 120). In these and other embodiments, the device 110 may be configured to operate as an intermediary between the remote device 114 and the networked devices 120. For example, the device 110 may be configured to communicate with the remote device 114 using a first network type and to communicate with one or more of the networked devices 120 using a second network type. The device 110 may handle the networking protocols of the first and second network types such that the remote device 114 and the networked devices 120 are unaware of differences in the networks and handle the communication session as if there were no changes in the network types or protocols.

In some embodiments, the remote device 114 may be any electronic, analog, or digital device. For example, the remote device 114 may include a laptop computer, a smartphone, a mobile phone, a tablet computer, a phone console, a public switched telephone network (PSTN) phone, or any other communication device. The remote device 114 may be configured to participate in a communication session with other devices. In the communication session, audio may be exchanged between the remote device 114 and the device 110 by way of the PSTN 112. In the present disclosure, reference to "audio," "local audio," "remote audio," and "networked device audio" related to communication sessions may include signals or data that may represent or be used to construct or reconstruct the audio of a communication session. In the present disclosure, reference to "video," local video," "remote video," and "networked device video" related to communication sessions may include signals or data that may represent or be used to construct or reconstruct the video of a communication session. The video may be a stream of images that are reproduced to generate the video.

The PSTN 112 may be any combination of analog, digital, and/or optical networks that form a public switched telephone network that may transport audio of a communication session between the device 110 and the remote device 114. For example, the device 110 may be directly coupled to an analog connection and the remote device 114 may be an analog connection. Between the analog connections coupled to the device 110 and the remote device 114, digital and/or optical networks may transport the audio between the device 110 and the remote device 114.

In some embodiments, the device 110 may be further configured to communicate with the transcription system 140. In these and other embodiments, the device 110 may be configured to provide audio from a communication session being handled by the device 110 to the transcription system 140 over the first network 102.

In some embodiments, the first network 102 may have numerous different configurations. In some embodiments, the first network 102 may include a peer-to-peer network. The first network 102 may also be coupled to or may include portions of a telecommunications network for sending data in a variety of different communication protocols. In some embodiments, the first network 102 may be an Internet Protocol (IP) based network. In some embodiments, the first network 102 may include cellular communication networks for sending and receiving communications and/or data including via hypertext transfer protocol (HTTP), direct data connection, wireless application protocol (WAP), etc. The first network 102 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks.

In some embodiments, the transcription system 140 may include any configuration of hardware, such as processors, servers, and databases that are networked together and configured to generate transcript data that includes a transcript of the audio by transcribing audio received over the first network 102. For example, the transcription system 140 may include multiple computing systems, such as multiple servers that each include memory and at least one processor, which are networked together and configured to perform operations as described in this disclosure, among other operations. In some embodiments, the transcription system 140 may include computer-readable-instructions that are configured to be executed by the transcription system 140 to perform operations described in this disclosure.

In some embodiments, the transcription system 140 may be configured to transcribe audio received from the device 110 to generate transcript data of the audio. In some embodiments, the transcription system 140 may include human intermediaries that may re-voice the audio received by the transcription system 140. The re-voiced audio may be transcribed by a system that is tuned or configured to the human intermediaries to generate the transcript data.

The transcription system 140 may provide the transcript data of the audio to the device 110. The device 110 may be configured to provide the transcript data of the audio to the networked devices 120 that are participating in the communication session. In some embodiments, the transcript data may include a transcription of the audio and other information configured to direct how the transcription of the audio is presented.

In some embodiments, the device 110 may communicate with the networked devices 120 over the second network 130. In some embodiments, the second network 130 may be configured as short-range wireless networks, such as a wireless local area network (LAN), a personal area network (PAN), or a wireless mesh network (WMN). For example, the second network 130 may be networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, among other types of LANS, PANS, and WMNS. In some embodiments, the second network 130 may be a combination of the wireless networks, such as Bluetooth® and IEEE 802.11 networks, among other types of combinations of short-range wireless networks.

In these and other embodiments, the second network 130 may be generally described as wireless networks, but different wireless protocols may be used for communication between the device 110 and the networked devices 120. For example, the device 110 may be configured to communicate with the first networked device 120a over an IEEE 802.11 network. During overlapping periods of time, the device 110 may be configured to communicate with the second networked device 120b over a Bluetooth network. Additionally, during overlapping periods of time, the device 110 may be configured to communicate with the third networked device 120c over a Zigbee wireless network or some other wireless communication network. Thus, the term second network 130 as used herein does not indicate that a same type of network is used to communicate with each of the networked devices 120, but rather refers generally to wireless networks that may be of any number of different types. Alternatively or additionally, the device 110 may communicate with each of the networked devices 120 over the same type of wireless network.

In some embodiments, the networked devices 120 may be multiple different types of devices that may be used by a hearing-impaired user(s) or other user(s). For example, the networked devices 120 may be electronic processing devices, such as desktop computers, laptop computers, tablets, smart phones, personal assistant devices, and other hand-held personal computing devices. In some embodiments, the networked devices 120 may be a television or other display device. In some embodiments, the networked devices 120 may be personal health care devices, such as a neck loop that acts as a handset, a hearing aid, a call button, an alert button, a headset, among other personal health care devices. In some embodiments, one or more of the networked devices 120 may be alert devices. In these and other embodiments, the one or more of the networked devices 120 may simply issue an alert when a request for a communication session is received at the device 110. For example, the alert may be an audio, visual, or other type of alert. In some embodiments, one or more of the networked devices 120 may be speaker phones or other telephonic devices.

In some embodiments, the networked devices 120 may be a combination of the electronic processing devices, the display devices, the personal health care devices, the alert devices, and telephonic devices. For example, the first networked device 120a may be a tablet, the second networked device 120b may be a television, and the third networked device 120c may be a neck loop that communicates with hearing aids of a hearing-impaired user.

The device 110 may be configured to periodically determine which of the networked devices 120 are available for communication sessions. For example, when one of the networked devices 120, such as the first networked device 120a, is first powered on, such as from a sleep mode or from being full-powered off, the first networked device 120a may register with the device 110. In some embodiments, the device 110 may send out periodic discovery signals to the networked devices 120 to allow the networked devices 120 to register with the device 110. Alternatively or additionally, the networked devices 120 may include instructions/protocols to register with the device 110 when powered on.

The device 110 may keep a registry of all of the networked devices 120 that are registered with the device 110. The device 110 may poll the networked devices 120 to help to maintain the accuracy of the registry. During the polling of the networked devices 120, if one of the networked devices 120 does not respond, the device 110 may remove the one of the networked devices 120 from the registry.

The device 110 may use the registry to determine which of the networked devices 120 may participate in a communication session with the remote device 114. For example, the networked devices 120 that are on the registry at the beginning of a communication session may be requested to be part of the communication session. After becoming part of the communication session, the networked devices 120 may receive audio from the communication session and transcript data of the audio. Alternatively or additionally, the networked devices 120 that are registered during a communication session or that accept requests of the communication session may be provided audio and transcript data of the audio from the communication session after registration.

In some embodiments, the device 110 may obtain further information regarding the networked devices 120. The information may indicate various abilities of the networked devices 120. For example, some of the networked devices 120 may be configured to broadcast audio from a communication session, but may lack a display for presentation of transcripts based on transcript data. Alternatively or additionally, some of the networked devices 120 may be configured to broadcast audio and display a presentation of transcripts, but may lack a microphone or other device to allow the networked devices 120 to generate audio as part of the communication session. Alternatively or additionally, some of the networked devices 120 may be configured to indicate that a communication session is being requested but not allow participation in the communication session.

In these and other embodiments, the device 110 may provide the portions of the communication session that are appropriate for the networked devices 120. For example, the device 110 may provide audio to a hearing aid but not transcript data of the audio as the hearing aid may not include a display to present the transcript data. Alternatively or additionally, the device 110 may use the information to determine which of the networked devices 120 may actively participate in the communication session. As used herein, to actively participate in a communication session may involve receiving audio and generating and transmitting audio during the communication session. For example, a tablet with a microphone may actively participate in a communication session because a user of the tablet may speak into the microphone such that the tablet may generate audio that is shared during the communication session. Likewise, the tablet may broadcast received audio over a speaker and present transcript data of the received audio on a display. As another example, a television may passively participate because the television may broadcast received audio over a speaker and present transcript data of the received audio on a display, but may not include a microphone to allow the television to generate and transmit audio.

In some embodiments, one or more of the networked devices 120 may only actively participate in a communication session initiated by the one or more of the networked devices 120. For example, the third networked device 120c may be an alert button. In these and other embodiments, the third networked device 120c may not receive transcript data or participate in communication sessions unless the communication session is commenced by the third networked device 120c. In these and other embodiments, the alert button may be wearable by a user such that a communication session with a particular individual or system may be established if the user is unable to reach another device to begin a communication session.

In some embodiments, the information regarding the networked devices 120 may be updated during the polling of the networked devices 120. In these and other embodiments, the device 110 may request information regarding the networked devices 120 during the polling. In some embodiments, the information may include whether the networked devices 120 may request a communication session with the remote device 114. Alternatively or additionally, the information may be a current configuration of the networked devices 120. In these and other embodiments, the networked devices 120 may change a configuration based on an interaction from a user, other devices, or particular settings in the networked devices 120. For example, the networked devices 120 may change a configuration based on a schedule of configurations. For example, the first networked device 120a may change its configuration based on a time of day or day of the week. In this example, at particular times, the first networked device 120a may accept audio and transcript data. At other times, the first networked device 120a may accept transcript data and not audio. In some embodiments, the received information may thus update the current configuration of one or more of the networked devices 120 in instances in which a corresponding configuration may have changed.

Various descriptions of the operation of elements in the environment 100 and interactions between the different elements of the environment 100 is now provided. In some embodiments, a communication session may be started by the remote device 114. In these and other embodiments, the device 110 may be associated with a number or other identifier for making communication sessions. The remote device 114 may send a request for a communication session over the PSTN 112 to the device 110. The device 110 may receive the communication session request and send the request out to the networked devices 120 based on which of the networked devices 120 may actively participate in a communication session. The device 110 may determine which of the networked devices 120 may actively participate based on the information received from the networked devices 120.

After one or more of the networked devices 120 accepts the request, the device 110 may establish the communication session between the one of the networked devices 120 that accepted the request and the remote device 114. The device 110 may further indicate to the other networked devices 120 that a communication session is being established. The other networked devices 120 may request active participation, passive participation, or no participation in the communication session. Alternatively or additionally, at any point during the communication session, a participation status of the other networked devices 120 may change between active participation, passive participation, and no participation in the communication session. Alternatively or additionally, the device 110 may indicate the participation of the networked devices 120 in the communication session.

During the communication session, the device 110 may receive remote audio from the remote device 114. The remote audio may be provided to the actively participating networked devices 120. Alternatively or additionally, the remote audio may be provided to passively participating networked devices 120. Thus, in some embodiments, the remote audio may be provided to each of the participating networked devices 120.

The remote audio may also be provided to the transcription system 140 over the first network 102. The transcription system 140 may generate transcript data of the remote audio and provide the transcript data to the device 110. The device 110 may provide the transcript data to the participating networked devices 120 that are configured to present transcriptions.

In some embodiments, each of the actively participating networked devices 120 may also generate and send networked device audio to the device 110. In these and other embodiments, the device 110 may send the networked device audio over the PSTN 112 to the remote device 114. In some embodiments, the device 110 may also send the networked device audio to each of the other networked devices 120 participating in the communication session over the second network 130. Furthermore, the device 110 may also send the networked device audio to the transcription system 140 over the first network 102. The device 110 may receive transcript data from the transcription system 140 of the networked device audio. The device 110 may provide the transcript data of the networked device audio to each of the participating networked devices 120 except the one of the networked devices 120 that generated the networked device audio. Alternatively or additionally, the device 110 may provide the transcript data of the networked device audio to each of the participating networked device 120. Thus, multiple users may participate in the communication session and receive transcript data of audio during the communication session of the audio that the multiple users did not originate.

When the remote device 114 terminates the communication session, the device 110 may receive an indication of the termination and terminate the communication session with each of the participating networked devices 120. When all of the actively participating networked devices 120 terminate the communication session, the device 110 may terminate the communication session with the remote device 114 and the passively participating networked devices 120. In these and other embodiments, when one of the actively participating networked devices 120 terminates the communication session but another actively participating networked device 120 does not terminate the communication session, the device 110 may maintain the communication session with the remote device 114. In these and other embodiments, the actively participating networked devices 120 that previously terminated their active participation in the communication session may become passively participating networked devices 120 or may be removed from the communication session such that no further audio and/or transcript data are provided to the previous actively participating networked devices 120.

As another example, in some embodiments, a communication session may be requested by the first networked device 120a. In these and other embodiments, the first networked device 120a may send a request for a communication session to the device 110. The device 110 may send the request to the remote device 114. After the remote device 114 accepts the request, the device 110 may provide an indication of the communication to the other networked devices 120 so that the other networked devices 120 may actively or passively participate in the communication session. As described previously, the audio during the communication session may be provided to some or all of the participating networked devices 120, the transcription system 140, and the remote device 114. Furthermore, transcript data of the audio from the transcription system 140 may be provided to the participating networked devices 120.

Another example of the operation of elements in the environment 100 is now provided. In this example, the first networked device 120a may be a smartphone, the second networked device 120b may be a Bluetooth neck-loop that provides audio to a hearing aid of a first user, and the third networked device 120c may be a television. In these and other embodiments, the first networked device 120a may actively participate, the second networked device 120b may passively participate and be configured to receive audio and no transcript data and the third networked device 120c may passively participate and be configured to receive transcript data and no audio. Furthermore, in this example, the remote device 114 may be a regular PSTN phone.

The device 110 may be associated with a PSTN phone number. In some embodiments, although not illustrated, a regular PSTN phone may be coupled to the PSTN 112 along with the device 110 in a residence of the first user and a second user. The remote device 114 may place a call to a phone number associated with an end node of the PSTN 112 coupled to the device 110 and the regular PSTN phone. In these and other embodiments, the central office of the PSTN 112 may be unaware of the device 110. Rather, the central office and the PSTN 112 may not be configured differently than if the end node of the PSTN 112 coupled to the device 110 was only coupled to a regular PSTN phone. From the perspective of the PSTN 112, the device 110 may behave as a regular PSTN phone.

After the call is placed by the remote device 114, the PSTN 112 may forward the request to the device 110 and the PSTN phone that is coupled to the PSTN 112 along with the device 110 in a residence of the first user and a second user. The PSTN phone may ring and the device 110 may look at the registry and determine the networked devices 120 that are registered. Of the registered devices, the first networked device 120a may actively participate in the communication session. The device 110 may indicate to the first networked device 120a that a request for the communication session has been received. The second user may request that the communication session be established using the first networked device 120a, which is a smart phone. The device 110 may follow the protocol to establish the communication session with the remote device 114. The device 110 may also indicate to the second networked device 120b and the third networked device 120c that a communication session is occurring and the second networked device 120b and the third networked device 120c may request to participate in the communication session as passive devices.

Second user audio generated by the first networked device 120a may be provided to the device 110 over the second network 130. The device 110 may provide the second user audio to the second networked device 120b, the transcription system 140, and the remote device 114. The audio may not be provided to the third networked device 120c based on the third networked device 120c being configured to not present audio. The transcript data of the second user audio may be provided to the third networked device 120c and presented by the third networked device 120c. The transcript data may not be provided to the second networked device 120b based on the second networked device 120b not being configured to present transcript data. Alternatively or additionally, the transcript data may be provided to the first networked device 120a.

Third party audio may be generated by the remote device 114 and provided to the device 110. The device 110 may direct the remote audio to the transcription system 140, the first networked device 120a, and the second networked device 120b. The transcript data of the remote audio is also provided to the first networked device 120a and the third networked device 120c. Alternatively or additionally, the transcript data may be provided to other devices of the networked devices 120 that are configured to receive transcript data. Thus, in this example, the second user may actively participate in the communication session with the remote device 114 using the smartphone. The second user may also be presented transcript data of audio from the remote device 114 by the first networked device 120a.

The first user may passively participate in the communication session using the Bluetooth neck device and the television. In these and other embodiments, the first user may be presented audio from the first networked device 120a and the remote device 114 by way of the Bluetooth neck device and transcript data of the audio from the first networked device 120a and the remote device 114 may be presented to the first user by way of the television.

In these and other embodiments, the PSTN phone that is coupled to the PSTN 112 along with the device 110 in a residence of the first user and a second user may join and be part of the communication session. In some embodiments, transcript data of the audio from the regular PSTN phone may be created. Alternatively or additionally, transcript data of the audio from the regular PSTN phone may not be created. In any event, transcript data of the audio from the remote device 114 may be available on one or more of the networked devices 120 such that a third user may participate in the communication session using the regular PSTN phone while viewing transcriptions from the transcript data of the audio from the remote device 114 on one of the networked devices 120.

Modifications, additions, or omissions may be made to the environment 100 without departing from the scope of the present disclosure. For example, the environment 100 may include more or less than the three networked devices 120 illustrated. Alternatively or additionally, the device 110 may include multiple devices. An example is provided with respect to FIG. 3. Furthermore, the environment 100 is illustrated as including the PSTN 112. The environment 100 may be configured to not include the PSTN 112. In these and other embodiments, the device 110 may include another network or may use the first network 102 to communicate with the remote device 114. In these and other embodiments, additional data, such as video data may be shared among the remote device 114, the device 110, and the networked devices 120.

As another example, in some embodiments, a user of the remote device 114 may be hearing impaired. In these and other embodiments, the transcription system 140 may provide transcript data of audio to the remote device 114 through a connection between the remote device 114 and the transcription system 140.

As another example, in some embodiments, the transcription system 140 may provide alterations to the device 110 of previously provided transcript data. In these and other embodiments, the device 110 may distribute the alterations to the networked devices 120.

Figure 2:
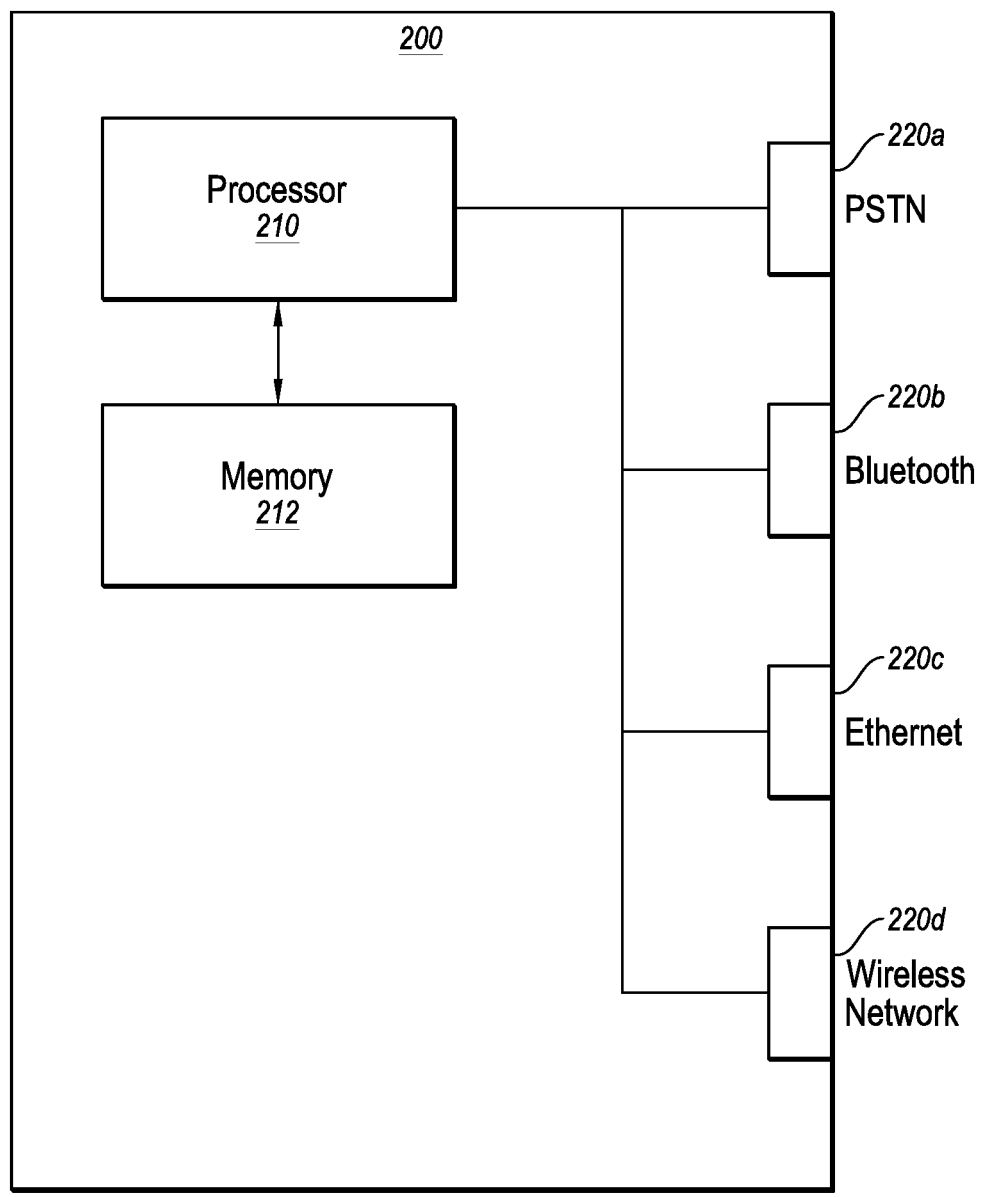
FIG. 2 illustrates an example network device.

FIG. 2 illustrates an example network device 200. The device 200 may be arranged in accordance with at least one embodiment described in the present disclosure. The device 200 may include a processor 210, a memory 212, a first network interface 220a, a second network interface 220b, a third network interface 220c, and a fourth network interface 220d, referred to collectively as the network interfaces 220.

In some embodiments, the device 200 may be an example of the device 110 of FIG. 1. In these and other embodiments, the device 200 may be configured to provide the functionality of the device 110.

Generally, the processor 210 may include any suitable special-purpose or general-purpose computer, computing entity, or processing device including various computer hardware or software modules and may be configured to execute instructions stored on any applicable computer-readable storage media. For example, the processor 210 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, it is understood that the processor 210 may include any number of processors distributed across any number of networks or physical locations that are configured to perform individually or collectively any number of operations described herein. In some embodiments, the processor 210 may interpret and/or execute program instructions and/or processing data stored in the memory 212. By interpreting and/or executing program instructions and/or process data stored in the memory 212, the device 200 may perform operations, such as the operations performed by the device 110 of FIG. 1.

The memory 212 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 210. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of *In re Nuijten*, 500 F.3d 1346 (Fed. Cir. 2007). In some embodiments, computer-executable instructions may include, for example, instructions and data configured to cause the processor 210 to perform a certain operation or group of operations as described in the present disclosure.

The first network interface 220a may be a PSTN network interface. The second network interface 220b may be a Bluetooth network interface. The third network interface 220c may be an Ethernet network interface. The fourth network interface 220d may be a wireless network interface. The network interfaces 220 may each be configured to handle their associated protocol and to provide the information to the processor 210 and/or other elements of the device 200 not illustrated.

For example, the first network interface 220a may be configured to handle protocols for a PSTN. In these and other embodiments, the first network interface 220a may be configured to recognize dial tones, voltages, and other aspects of protocols for transmission and reception of audio over a PSTN. In some embodiments, the first network interface 220a may receive analog audio from a PSTN. The first network interface 220a may convert the analog audio to digital audio and provide the digital audio to the processor 210. The processor 210 may provide the digital audio to other of the network interfaces 220 for transmission to other devices/systems, such as the transcription system 140 and the networked devices 120 of FIG. 1.

The first network interface 220a may be configured to handle other protocols associated with a PSTN. For example, the first network interface 220a may be configured to detect tones that indicate a voice mail is available, such as shutter tones. In these and other embodiments, the first network interface 220a may be configured to obtain the voice mail, convert the voice mail to a digital voice mail, and provide the digital voice mail to the processor 210. In these and other embodiments, the processor 210 may be configured to provide the digital voice mail to the third network interface 220c for transmission to a transcription system. The processor 210 may also be configured to provide an indication of and/or the digital voice mail to one or more other devices by way of the second network interface 220b or the fourth network interface 220d.

In some embodiments, the first network interface 220a may also be configured to determine if the PSTN is functioning properly. For example, the first network interface 220a may determine if there is no dial tone on the PSTN. In these and other embodiments, the first network interface 220a may indicate the improper function of the PSTN to the processor 210. The processor 210 may provide an indication of the improper function of the PSTN to an entity that oversees the PSTN through one or more of the other network interfaces 220. In these and other embodiments, the processor 210 may be further configured to direct communication sessions directed to the PSTN to another network such that a communication session may be established even though the PSTN is not functioning properly.

The second network interface 220b may be configured to handle protocols associated with a Bluetooth network. In these and other embodiments, the second network interface 220b may receive digital data from the processor 210 for transmission over the Bluetooth network and send digital data to the processor 210 received over the Bluetooth network. The second network interface 220b may package the digital data and handle the handshaking for communication with other devices over the Bluetooth network.

The third network interface 220c may be configured to handle protocols associated with an Ethernet network. In these and other embodiments, the third network interface 220c may receive digital data from the processor 210 for transmission over the Ethernet network and send digital data to the processor 210 received over the Ethernet network. The third network interface 220c may package the digital data and handle the handshaking for communication with other devices over the Ethernet network.

The fourth network interface 220d may be configured to handle protocols associated with a wireless network. In these and other embodiments, the fourth network interface 220d may receive digital data from the processor 210 for transmission over the wireless network and send digital data to the processor 210 received over the wireless network. The fourth network interface 220d may package the digital data and handle the handshaking for communication with other devices over the wireless network.

An example of the operation of the device 200 is provided. The example assumes that the device 200 is used in place of the device 110 of FIG. 1. A communication session may be established using the first network interface 220a with the remote device 114. Third party audio from the first network interface 220a may be provided to the processor 210. The processor 210 may direct the remote audio to the third network interface 220c for transmission over the first network 102 to the transcription system 140. The third network interface 220c may also receive remote transcript data of the remote audio and provide the remote transcript data to the processor 210. The processor 210 may provide the remote audio and the remote transcript data to the fourth network interface 220d for transmission over the wireless network to the third networked device 120c.

The fourth network interface 220d may also receive networked audio from the third networked device 120c over the wireless network and provide the networked audio to the processor 210. The processor 210 may direct the networked audio to the third network interface 220c for transmission to the transcription system 140 and to the first network interface 220a for transmission over the PSTN 112 to the remote device 114. The transcription system 140 may provide a networked transcript data to the third network interface 220c, which may provide the networked transcript data to the processor 210. The processor 210 may send the networked transcript data, the networked audio, the remote audio, and the remote transcript data to the second network interface 220b for transmission over the Bluetooth network to the second networked device 120b.

Modifications, additions, or omissions may be made to the device 200 without departing from the scope of the present disclosure. For example, the device 200 may include more or fewer network interfaces 220. For example, the device 200 may be coupled to a wireless router that may handle the wireless network hand shaking and protocol. In these and other embodiments, the third network interface 220c may handle the traffic for both the third network interface 220c and the fourth network interface 220d as illustrated.

Alternatively or additionally, the network interfaces 220 may be configured for different types of networks than those described. Alternatively or additionally, the device 200 may include additional components/elements that may interact with the processor 210 and the network interfaces 220 to provide the functionality of the device 200 as described in the present disclosure.

Figure 3:
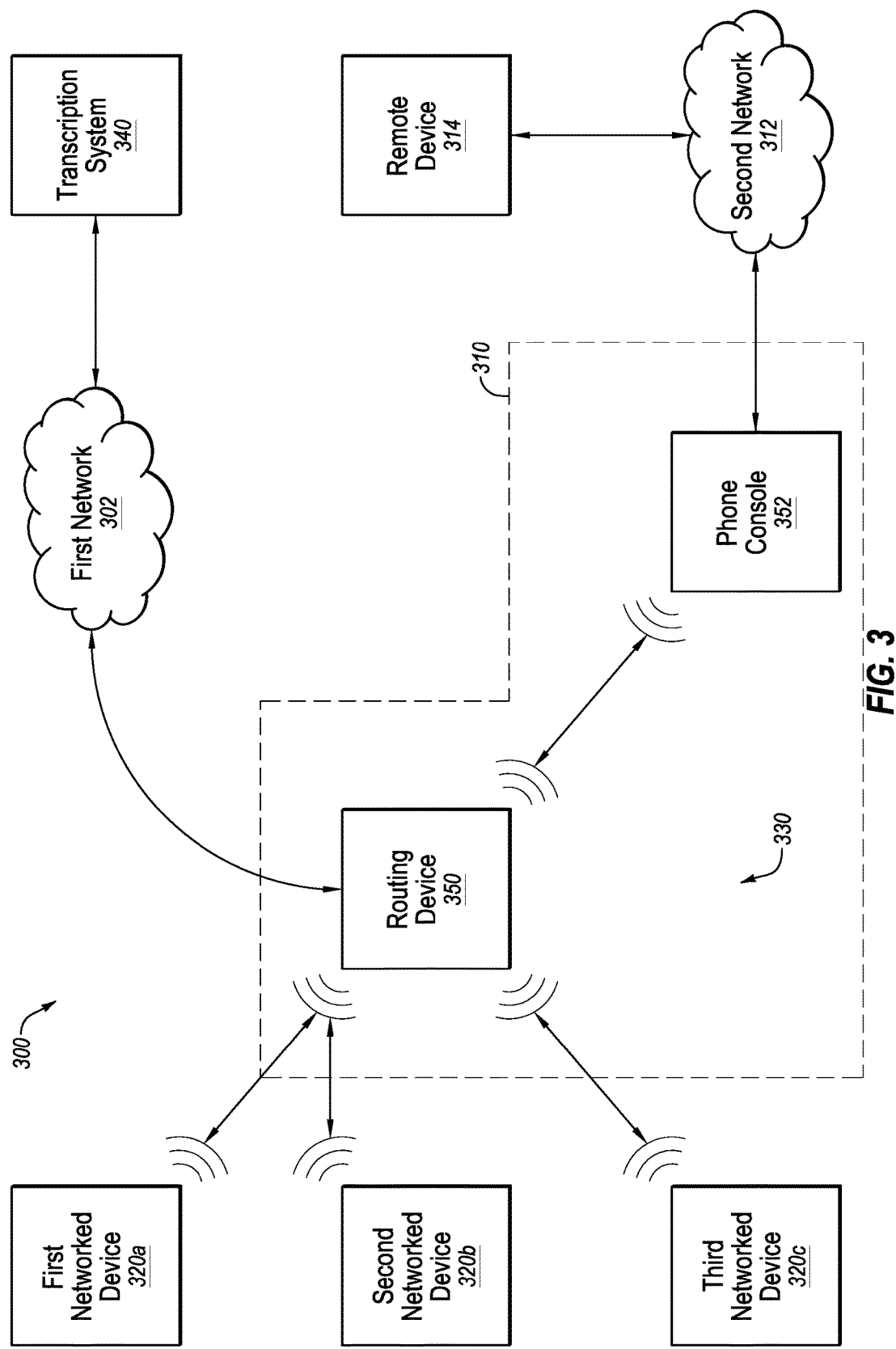
FIG. 3 illustrates another example environment for communication sessions that include presentations of transcriptions of the communication sessions.

FIG. 3 illustrates another example environment 300 for communication sessions that include presentations of transcriptions of the communication sessions. The environment 300 may be arranged in accordance with at least one embodiment described in the present disclosure. The environment 300 may include a first network 302, a device 310, a second network 312, a remote device 314, a first networked device 320a, a second networked device 320b, a third networked device 320c (referred to collectively as the networked devices 320), a second network 330, and a transcription system 340.

The first network 302, the networked devices 320, and the transcription system 340 may be analogous to the first network 102, the networked devices 120, and the transcription system 140 of FIG. 1, respectively, and no further description is provided herein. The second network 312 may be analogous to the first network 302 and the first network 102 of FIG. 1. In some embodiments, the second network 312 may be the same as the first network 302.

The remote device 314 may be an electronic device with which a communication session may be established. In these and other embodiments, the communication session may be an audio or a video communication session.

The device 310 may include the functionality of the device 110 of FIG. 1 as well as additional functionality. In some embodiments, the device 310 may include a routing device 350 and a phone console 352. The phone console 352 may include a display, a microphone, a speaker, and a handset. The phone console 352 may be configured to establish a communication session with the remote device 314, using either video or audio. The phone console 352 may be further configured to present a transcription of the video or audio from the communication session based on transcript data. In these and other embodiments, a communication session with the phone console 352 may also be joined by one or more of the networked devices 320 in the manner described with respect to FIG. 1.

The routing device 350 may be a routing device that is a slave to the phone console. The routing device 350 may be configured to interface with the different wireless networks of the second network 330. In these and other embodiments, the phone console 352 may direct the routing of audio, video, and transcriptions among the networked devices 320 and the remote device 314 by way of the routing device 350. In these and other embodiments, the routing device 350 may be used to handle the establishment of connections and handling protocol and packet handling between the phone console 352, the networked devices 320, and the transcription system 340. In some embodiments, the phone console 352 may talk directly to the transcription system 340 over the first network 302.

Modifications, additions, or omissions may be made to the environment 300 without departing from the scope of the present disclosure. For example, the routing device 350 may be part of the phone console 352, such that the device 310 is housed in a single housing, analogous to device 110 of FIG. 1. Alternately or additionally, the routing device 350 and the phone console 352 may be coupled through a different network than the second network 330, such as a wired network.

Figure 4:
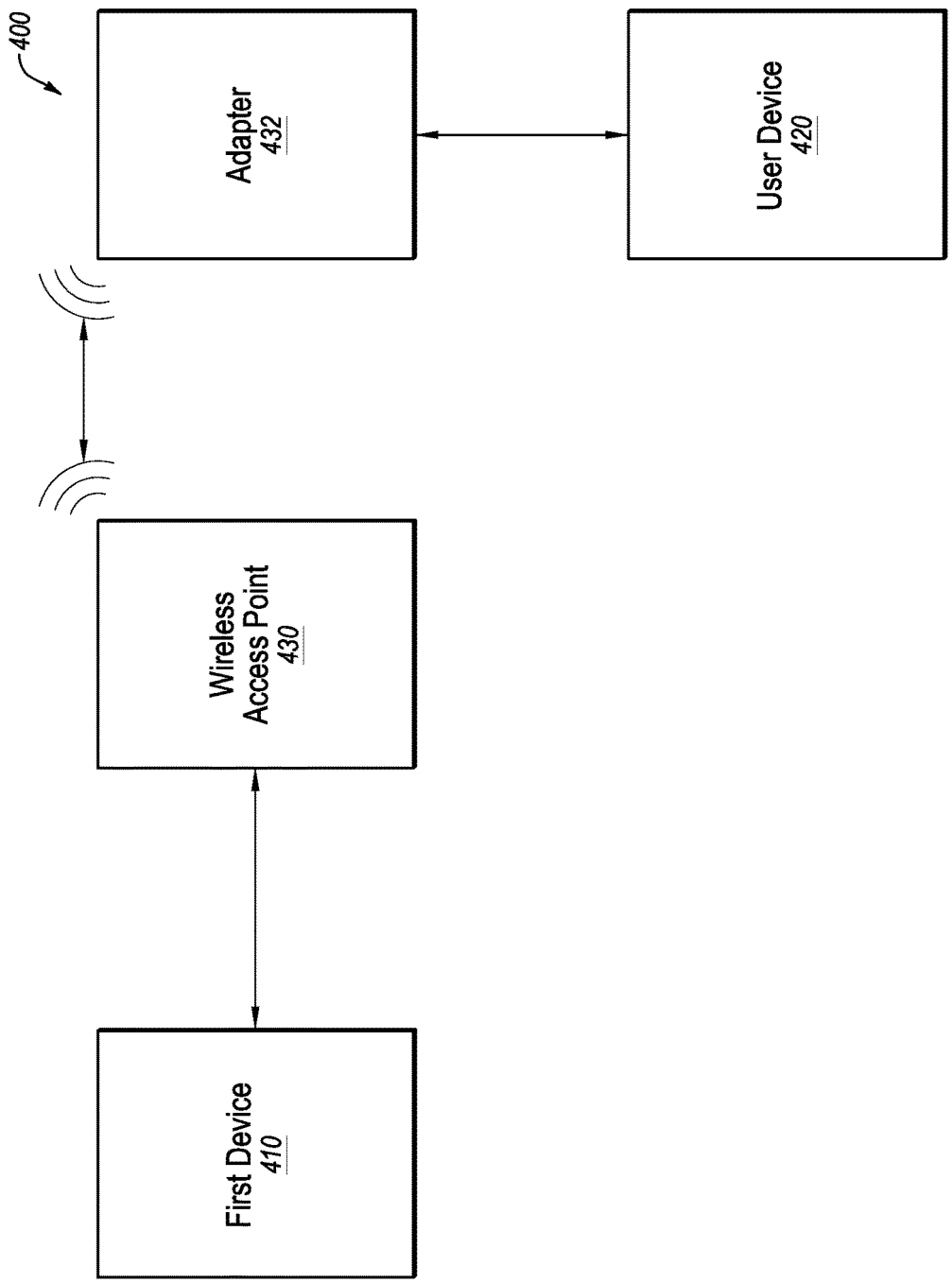
FIG. 4 illustrates another example environment for communication sessions that include presentations of transcriptions of the communication sessions.

FIG. 4 illustrates another example environment 400 for communication sessions that include presentations of transcriptions of the communication sessions. The environment 400 may be arranged in accordance with at least one embodiment described in the present disclosure. The environment 400 includes a first device 410, a wireless access point 430, an adapter 432, and a user device 420.

The environment 400 illustrates another embodiment of a portion of the environment 300 or the environment 100 of FIGS. 3 and 1, respectively. For example, the first device 410 and the wireless access point 430 may together perform the functionality of the device 110 of FIG. 1 and/or the device 200 of FIG. 2. In these and other embodiments, the first device 410 may include a processor to direct the operations performed by the device 110 of FIG. 1 and/or the device 200 of FIG. 2. The wireless access point 430 may be analogous to the fourth network interface 220d of FIG. 2 and may provide information protocol and packet handling for a wireless network.

The user device 420 and the adapter 432 may together perform the functionality of one of the networked devices 120 and/or networked devices 320 of FIGS. 1 and 3, respectively. In these and other embodiments, the user device 420 may be a device that provides functionality outside of the systems/methods described in the present disclosure. For example, the user device 420 may be a display. The adapter 432 may be used in connection with the user device 420 so that together the adapter 432 and the user device 420 may actively participate in a communication session and present a transcription of the communication session based on transcript data. For example, the user device 420 may be a television that does not include a microphone. The adapter 432 may be a microphone and include a processor and software that is configured to communicate with the first device 410 over a wireless network. The adapter 432 may provide audio and transcript data to the user device 420 for presentation by the user device 420 and may handle other functionality of the networked devices 120 and the networked devices 320 described in this disclosure.

Modifications, additions, or omissions may be made to the environment 400 without departing from the scope of the present disclosure. For example, the wireless access point 430 and the first device 410 may be combined as a single device.

Figure 5A:
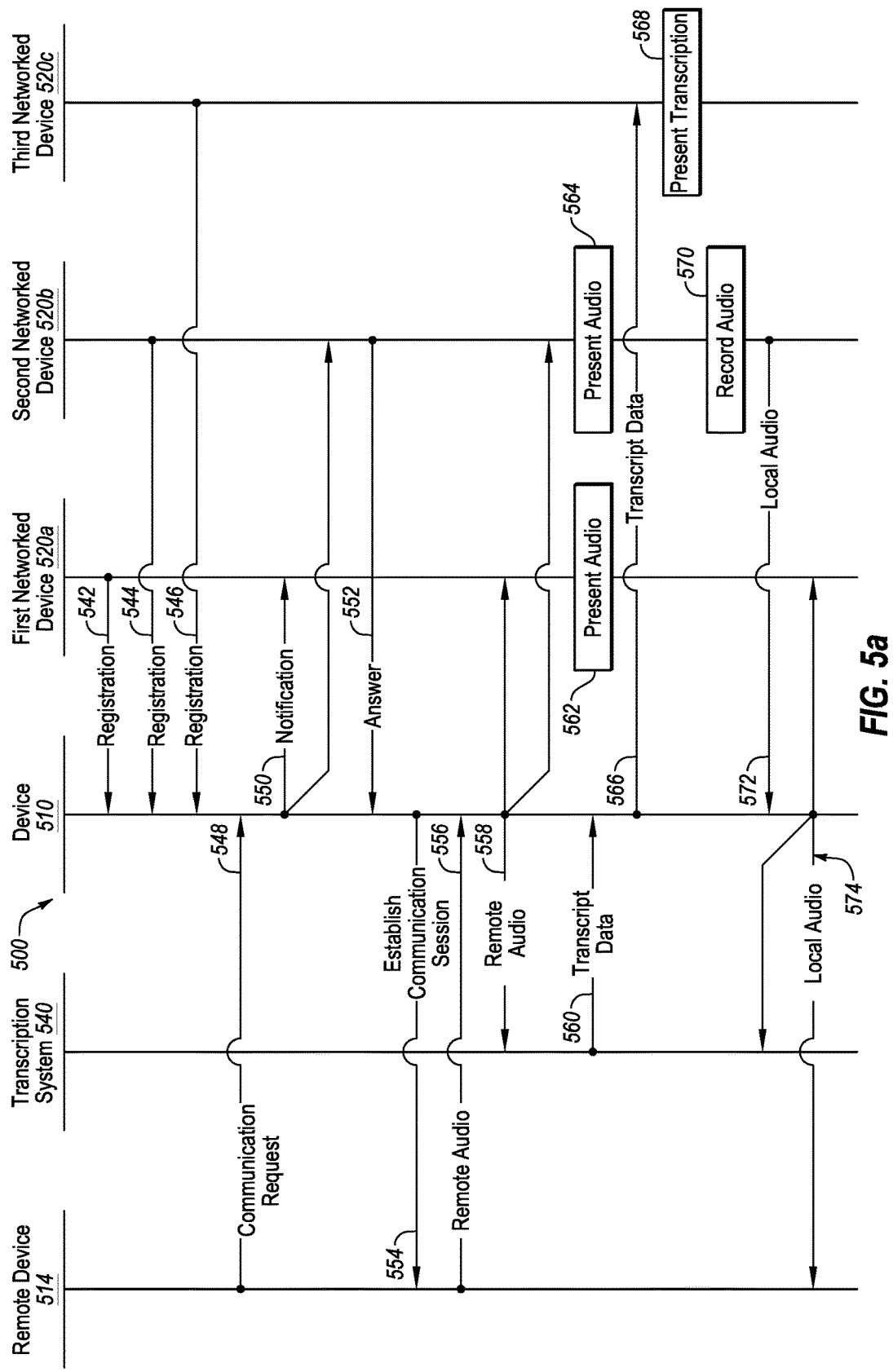
FIGS. 5a and 5b illustrates example operations to enable communication sessions that include presentations of transcriptions of the communication sessions.
Figure 5B:
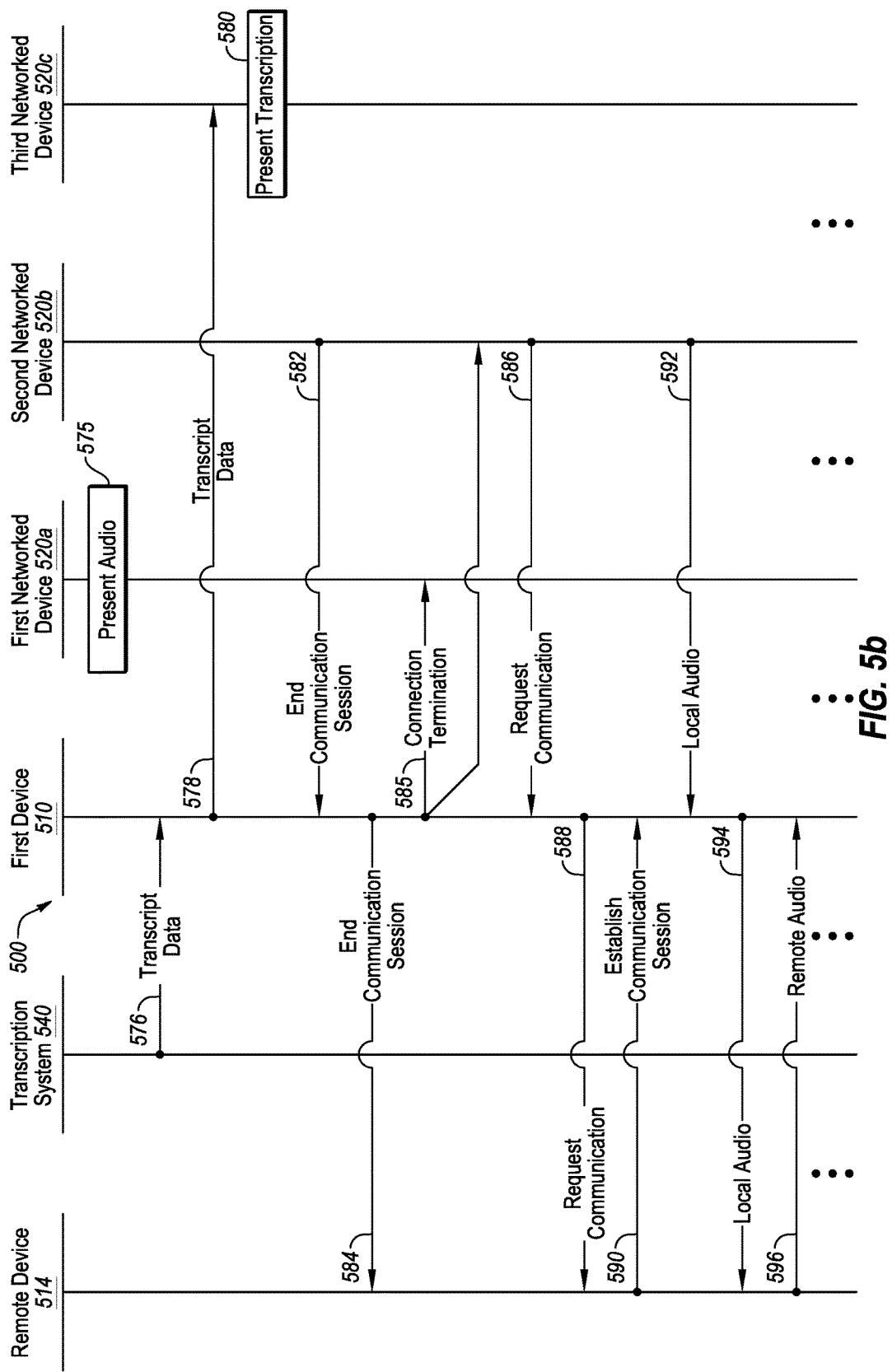

FIGS. 5a and 5b illustrates example operations 500 to enable communication sessions that include presentations of transcriptions of the communication sessions. The operations 500 may be arranged in accordance with at least one embodiment described in the present disclosure. The operations 500 may include examples of communications and interactions between and operations performed by a device 510, a remote device 514, a first networked device 520a, a second networked device 520b, a third networked device 520c (the networked devices 520), and a transcription system 540. In some embodiments, the device 510, the remote device 514, the first networked device 520a, the second networked device 520b, the third networked device 520c, and the transcription system 540 may be analogous to the device 110, the remote device 114, the first networked device 120a, the second networked device 120b, the third networked device 120c, and the transcription system 140, respectively, of FIG. 1. Accordingly, no further explanation is provided with respect thereto.

Generally, the operations 500 may relate to presentation of transcriptions of audio presented by one or more of the networked devices 520. The interactions between the device 510, the remote device 514, the first networked device 520a, the second networked device 520b, the third networked device 520c, and the transcription system 540 may occur over one or more networks as previously described and as described with respect to FIGS. 5a and 5b. The operations 500 illustrated are not exhaustive but are merely representative of operations 500 that may occur. Furthermore, one operation as illustrated may represent one or more communications, operations, and/or data exchanges between the device 510, the remote device 514, the first networked device 520a, the second networked device 520b, the third networked device 520c, and the transcription system 540.

At operation 542, the first networked device 520a may register with the device 510 over a first network. The first networked device 520a may register with the device 510 after being discovered by the device 510. In these and other embodiments, the first networked device 520a may transmit data packets over the first network that include an identifier associated with the device 510. When the device 510 recognizes that a data packet is being transmitted over the first network, the device 510 may send a discovery request to the first networked device 520a to thereby allow the first networked device 520a to register with the device 510. Alternatively or additionally, the device 510 may send out discover requests over the first network and the first networked device 520a may respond to the discover request.

In some embodiments, the first network may be a wireless network. For example, the first network may be a short-range wireless network, such as a wireless local area network (LAN), a personal area network (PAN), or a wireless mesh network (WMN) as described in this disclosure. As described in this disclosure, the device 510 and the first networked device 520a may be located such that communication over the short-range wireless network occurs without intermediary devices, such as additional servers or routers in other cloud based or Internet Protocol (IP) based networks.

In some embodiments, registration with the device 510 may include the first networked device 520a indicating the capabilities of the first networked device 520a to the device 510. The capabilities may include whether the first networked device 520a is able to receive and broadcast audio with a speaker, capture audio through a microphone and transmit the captured audio, receive transcript data and display transcriptions based on the transcript data, present a notification of a communication session, for example ringing or other notification, present communication session requester information, such as caller identification, among other capabilities. With respect to the example illustrated in FIGS. 5a and 5b, the first networked device 520a may include an ability to receive and broadcast audio with a speaker and present a notification of a communication session.

At operation 544, the second networked device 520b may register with the device 510 over a second network. The second networked device 520b may register with the device 510 after being discovered by the device 510. The second networked device 520b may be discovered in an analogous manner as described with the respect to the discovery of the first networked device 520a.

In some embodiments, the second network may be a wireless network. For example, the second network may be a short-range wireless network, such as a wireless local area network (LAN), a personal area network (PAN), or a wireless mesh network (WMN) as described in this disclosure. As described in this disclosure, the device 510 and the first networked device 520a may be located such that communication over the short-range wireless network occurs without intermediary devices, such as additional servers or routers in other cloud based or Internet Protocol (IP) based networks. As described with respect to FIGS. 5a and 5b, the first network and the second network may be different types of short-range wireless networks. However, in other embodiments, the first network and the second network may be the same type of short-range wireless network.

With respect to the example illustrated in FIGS. 5a and 5b, the second networked device 520b may register with the device 510 by indicating that the second networked device 520b includes an ability to receive and broadcast audio with a speaker, capture audio through a microphone and transmit the captured audio, and present a notification of a communication session.

At operation 546, the third networked device 520c may register with the device 510 over the first network. Alternatively or additionally, the third networked device 520c may communicate with the device 510 over the second network or a third network that is a short-range wireless network. The third networked device 520c may register with the device 510 after being discovered by the device 510. The third networked device 520c may be discovered in an analogous manner as described with respect to the discovery of the first networked device 520a.

With respect to the example illustrated in FIGS. 5a and 5b, the third networked device 520c may register with the device 510 by indicating that the third networked device 520c includes an ability to receive transcript data and display transcriptions based on the transcript data.

At operation 548, the device 510 may receive a communication request from the remote device 514 over a fourth network. The fourth network may include portions of a telecommunications network for sending data over a variety of different communication protocols. The interface with the device 510 may be a cellular type network, a PSTN network, an IP network (such as a mobile data network or wired IP network) or other type of communication network, such as a short range wireless network where the communication request is routed to the device 510 from the telecommunications network.

The device 510 may be configured to interface with the fourth network and handle the network and communication protocols to respond to the communication request and establish a communication session with the remote device 514.

At operation 550, in response to the communication request, the device 510 may send a notification to the first networked device 520a and the second networked device 520b. The notification may be sent to the first networked device 520a and the second networked device 520b based on the first networked device 520a and the second networked device 520b registering with the device 510 as including the ability to present a notification of a communication session. In some embodiments, the device 510 may send the notification using a protocol unique to the communication between the device 510 and the networked devices 520. In these and other embodiments, the networked devices 520 may not be aware of the protocol or network from which the device 510 received the communication request. Rather, the networked devices 520 may respond using the protocol unique to the communication between the device 510 and the networked devices 520 without concern of any additional communication protocols that may be used to communicate with the remote device 514.

For example, when the fourth network is a PSTN line, the device 510 may send the notification at operation 550. The notification may be in response to a sine wave or other change in voltage or current on the fourth network indicating a communication request. The device 510 may not revoke the notification until after the sine wave or other change in voltage indicates that the request has ended or until some other action is taken, such as directing the communication request to voice mail.

At operation 552, the second networked device 520b may send a communication to the device 510 answering the request. The communication may be sent by the second networked device 520b in response to a user interaction with the second networked device 520b. For example, the second networked device 520b may provide an indication of the notification by broadcasting audio, vibrating, and/or emitting light. In response, the user may interact with the second networked device 520b. For example, when the second networked device 520b is a PSTN phone, the user may move a receiver to place the receiver in an off-hook state. Alternatively or additionally, the second networked device 520b may be a tablet or smart phone. In these and other embodiments, a user of the second networked device 520b may click a button or interact with a screen of the second networked device 520b to indicate to the second networked device 520b to respond to the notification and request to establish a communication session.

At operation 554, the device 510 may follow an appropriate protocol to establish a communication session with the remote device 514. The remote device 514 may be unaware that the user is not interacting with the device 510 during the communication session. From the perspective of the remote device 514 and the fourth network, the device 510 may be the only device participating in the communication session. In short, the device 510 may function as a gate keeper and handle communications between the networked devices 520 and the device 510 without involving the remote device 514. As a result, the networked devices 520 are unaware of the remote device 514 and the type of the fourth network. As a result, the networked devices 520 may include no additional hardware or software to allow them to participate in communication sessions that occur over a range of different types of networks.

The communication session may include passing of audio and/or video back and forth between the remote device 514 and the device 510. For example, a user of the remote device 514 and a user of one or more of the networked devices 520 may carry on an audio only conversation or an audio and video conversation during the communication session.

At operation 556, the device 510 may obtain remote audio from the remote device 514. The remote audio may be audio captured by the remote device 514 that includes speech of the user of the remote device 514.

At operation 558, the device 510 may relay the remote audio to the first networked device 520a and the second networked device 520b. The device 510 may relay the remote audio to the first networked device 520a and the second networked device 520b because the first networked device 520a and the second networked device 520b indicated during the registration an ability to receive and broadcast audio.

The device 510 may be further configured to direct the remote audio to the transcription system 540. In some embodiments, the device 510 may direct the remote audio to the transcription system 540 over a fifth network. In these and other embodiments, the fifth network may be an IP network, such as the Internet.

At operation 560, the device 510 may obtain transcript data from the transcription system 540. The transcript data may be generated by the transcription system 540 based on the remote audio. In these and other embodiments, the transcript data may include a transcription of the remote audio. The transcription system 540 may generate the transcript data in substantially real-time. As a result, the device 510 may receive the transcript data within one to ten seconds after sending the remote audio to the transcription system 540.

At operation 562, the first networked device 520a may be configured to present the remote audio received from the device 510. Presenting the remote audio may include broadcasting the remote audio through a speaker into the air to allow a user to hear the remote audio. At operation 564, the second networked device 520b may be configured to present the remote audio received from the device 510. The operations 562 and 564 may occur at substantially the same-time such that there is little or no difference or delay between the remote audio presented by the first networked device 520a and the second networked device 520b.

At operation 566, the device 510 may send the transcript data to the third networked device 520c. At operation 568, the third networked device 520c may be configured to present a transcription of the remote audio based on the transcript data. To present the transcription, the third networked device 520c may display the transcription on a screen to be read by a user of the third networked device 520c.

The transcription may be presented to be substantially aligned with the presentation of the remote audio by the first networked device 520a and the second networked device 520b. For example, when the remote audio includes speech that includes a first word, the transcription of the first word may be displayed within one to ten seconds after the first word is broadcast as part of the remote audio. The transcription may assist a user of the first networked device 520*a* and/or the second networked device 520*b* to understand speech in the remote audio.

At operation 570, the second networked device 520*b* may record local audio based on sounds presented at a microphone of the second networked device 520*b*. The sounds may be based on speech of a user of the second networked device 520*b* that is participating in the communication session. The local audio may be a digitized version of the speech of the user.

At operation 572, the second networked device 520*b* may send the local audio to the device 510. The device 510 may convert the local audio to the format needed to send the local audio to the remote device 514 and the transcription system 540. For example, if the fourth network is a PSTN network, the device 510 may convert the digital local audio into analog for providing over the fourth network. As another example, if the fourth network is an IP network, the device 510 may packetize the local audio into IP network packets for sending over the IP network.

At operation 574, the device 510 may send the local audio to the remote device 514, the first networked device 520*a*, and to the transcription system 540. The remote device 514 may present the local audio by broadcasting the local audio over a speaker for a user of the remote device 514 to hear. In this manner, a user of the second networked device 520*b* may communicate with a user of the remote device 514. The transcription system 540 may generate transcript data of the local audio. The transcript data of the local audio may include a transcription of the local audio.

At operation 575, the first networked device 520*a* may present the local audio obtained from the device 510. As an example, the first networked device 520*a* may be a hearing aid that provides audio but does not include a microphone. Thus, a user using the first networked device 520*a* may passively participate in the communication session and hear a user of the remote device 514 and a user of the second networked device 520*b*.

Note that the second networked device 520*b* does not provide the local audio to the first networked device 520*a*. In these and other embodiments, the first networked device 520*a* and the second networked device 520*b* may not be aware of the presence of the other. The first networked device 520*a* and the second networked device 520*b* may communicate with the device 510 and be unaware of other communications involving the device 510.

At operation 576, the transcription system 540 may provide the transcript data to the device 510 over the fifth network. At operation 578, the device 510 may provide the transcript data to the third networked device 520*c* over the network through which the device 510 and the third networked device 520*c* are communicating, such as the second or third network.

At operation 580, the third networked device 520*c* may present a transcription of the local audio based on the transcript data of the local audio. The transcription may be displayed on a display so that the transcription may be read. The transcription may be displayed substantially aligned with the presentation of the audio by the first networked device 520*a* in operation 575. In these and other embodiments, presenting the transcription of the local audio may assist a user of the first networked device 520*a* to understand the local audio provided by the second networked device 520*b*.

At operation 582, the second networked device 520*b* may indicate to the device 510 to end the communication session. In some embodiments, the second networked device 520*b* may receive input from a user to end the communication session. The second networked device 520*b* may provide the indication to the device 510.

At operation 584, the device 510 may send an end communication session indication to the remote device 514. In these and other embodiments, the device 510 may follow the protocol of the fourth network to send the end communication session indication. For example, when the fourth network is a PSTN network, the device 510 may change a connection status to indicate a termination of the communication session.

At operation 585, the device 510 may send an end communication session to the first networked device 520*a* and the third networked device 520*c* to allow the first networked device 520*a* and the third networked device 520*c* to conclude the communication session.

At operation 586, the second networked device 520*b* may request a communication session with the remote device 514. The communication session request may include information about the remote device 514. The information may include a phone number or other identifier of the remote device 514. The information may be in a form particular to the protocol used between the device 510 and the third networked device 520*c*. In these and other embodiments, the device 510 may convert the information into a form that may be used to send a communication session request to the remote device 514.

At operation 588, the device 510 may send a communication request to the remote device 514 in response to receiving the request from the second networked device 520*b*. At operation 590, a communication session may be established between the device 510 and the remote device 514 based on the request from the second networked device 520*b*.

At operation 592, the second networked device 520*b* may send the device 510 local audio. The local audio may be audio generated by a microphone of the second networked device 520*b* based on speech of a user of the second networked device 520*b*.

At operation 594, the device 510 may send the local audio to the remote device 514 as analogously performed in the operation 574. In operation 596, the device 510 may obtain remote audio from the remote device 514 as analogously performed in the operation 556. Additional operations may be performed analogously to performance of the operations 558, 560, 564, and 566 as previously explained.

Modifications, additions, or omissions may be made to the operations 500 without departing from the scope of the present disclosure. For example, in some embodiments, the operations 500 may not include one or more of the operations described. For example, the operations 500 may not include the operations 542, 562, 575, 576, and/or 578. In some embodiments, the operations 500 may include additional operations. As another example, in some embodiments, the operations 500 may be arranged in a different order. As another example, in some embodiments, the operations 500 may be performed by a different device. For example, the operation 580 may be performed by another networked device or by the first networked device 520*a*.

Figure 6:
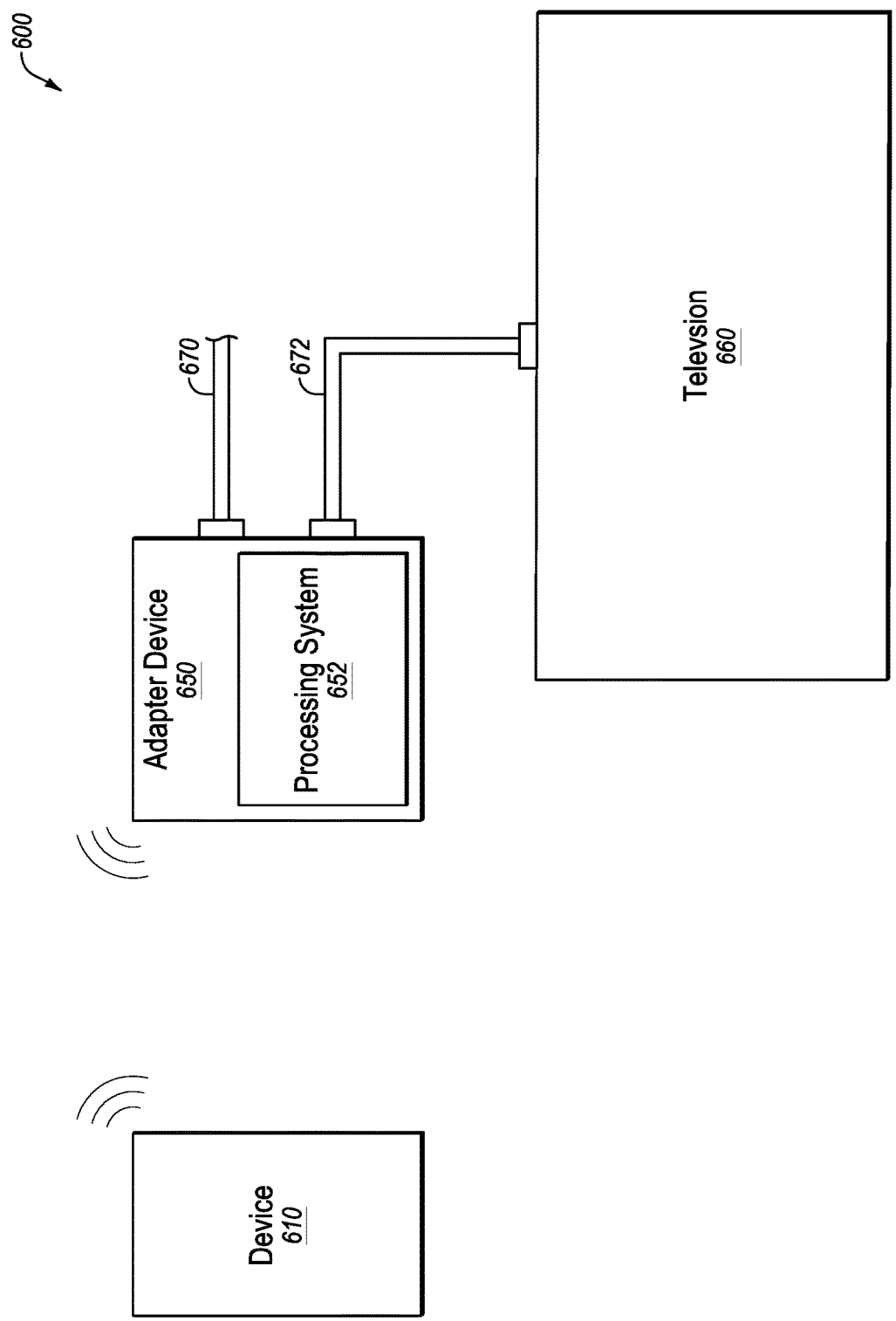
FIG. 6 illustrates an example environment for presentation of transcriptions.

FIG. 6 illustrates an example environment 600 for presentation of transcriptions. The environment 600 may be arranged in accordance with at least one embodiment described in the present disclosure. The environment 600 may include a device 610, an adapter device 650 that includes a processing system 652, a television 660, a first cable 670, and a second cable 672. The device 610 may be analogous to the device 110 and 510 of FIGS. 1 and 5. In some embodiments, the adapter device 650 and the television 660 together may perform one or more of the operations analogous to the operations performed by networked devices 120 and 520 of FIGS. 1 and 5. In some embodiments, the adapter device 650 and the television 660 may be analogous to the adapter 432 and the user device 420, respectively, of FIG. 4. Accordingly, limited explanation to some of the elements and/or operations of the elements in the environment 600 may be provided in the discussion of FIG. 6.

The adapter device 650 may include the processing system 652 and may be coupled to the first cable 670. The processing system 652 may include one or more processors, computer-readable media, and other devices that are configured to perform or cause the adapter device to perform operations discussed in this disclosure.

The first cable 670 may be configured to carry a video stream that is configured to be provided to the television 660. The video stream may originate from a video stream source. The video stream source may be any type of video source, such as, a DVD® player, Blue-Ray® player, cable box, satellite television box, digital video recorder, computer, streaming player, or other device configured to provide a video stream. The first cable 670 may provide the video stream to the adapter device 650.

The second cable 672 may communicatively couple the adapter device 650 and the television 660. In these and other embodiments, the second cable 672 may carry the video stream from the adapter device 650 to the television 660. The second cable 672 may also be configured to carry additional information from the adapter device 650 to the television 660. The additional information may include a transcription of transcript data the adapter device 650 receives from the device 610 and/or control data to control the operation of the television 660.

The television 660 may be configured to display images received over the second cable 672. The images may include the video stream and/or the information from the adapter device 650. In some embodiments, the television 660 may be further configured to receive commands from the adapter device 650. The commands may include turning on, coming to an awake state from a sleep state, adjusting display settings, such as contrast and brightness, and adjusting volume levels, among other commands.

In some embodiments, the adapter device 650 may be configured to communicate with the device 610 over a wireless network. In these and other embodiments, the adapter device 650 may be configured to receive transcript data from the device 610. In response to receiving the transcript data, the adapter device 650 may be configured to provide the television 660 with the transcription from the transcript data.

In some embodiments, the adapter device 650 may be configured to combine the video stream from the first cable 670 with the transcription. In these and other embodiments, the adapter device 650 may provide the television 660 with the combined video stream and transcription. In these and other embodiments, the television 660 may be unaware of the transcription. Rather, the television 660 may receive a video stream with the transcription embedded therein such that the television 660 merely displays the received combined stream and in the process displays the transcription.

In some embodiments, the video stream and the transcription may be combined such that the transcription overlays the video stream. In these and other embodiments, the transcription may be transparent or semitransparent such that the video stream may be partially visible behind the transcription. In these and other embodiments, the video stream and the transcription may be combined using an alpha blending technique among other video blending techniques. In these and other techniques, the transcription may be combined with the video stream by adjusting pixel information of the video stream to display the transcription. Thus, in these and other embodiments, the combining of the video stream and the transcription does not indicate that the information is merely passed together to the television 660 from the adapter device 650. Rather, the combining may indicate that the pixel data of the video stream may be altered such that when rendered, the television 660 displays the video stream and the transcription in front of the video stream. In these and other embodiments, the transcription may cover a portion of the video stream that is less than ten, twenty-five, fifty, or seventy-five percent, or some other portion of the video stream as displayed by the television 660.

In these and other embodiments, the video stream may be a video stream that the television 660 is displaying before the adapter device 650 receives the transcript data from the device 610. In these and other embodiments, the adapter device 650 may be relaying the video stream from the first cable 670 to the television 660 by way of the second cable 672. In these and other embodiments, in response to receiving the transcript data, the adapter device 650 may begin combining a transcription based on the transcript data and the video stream. The combined video stream and transcription may be provided to the television 660 for display by the television 660. In these and other embodiments, the transcription may not be associated with, correspond to, or otherwise correlate to the video stream. Rather, the transcription may be of remote audio of a communication session directed by the device 610. The video stream may be the video stream that a user of the television 660 has selected to be viewing at the time that the communication session occurs and may not be related in any manner to the transcription besides occurring in overlapping time intervals.

In some embodiments, the transcription may be provided to the television 660 to be presented as closed-captioning. In these and other embodiments, the transcription may be presented in a similar manner as closed-captioning that is provided by a media provider in a video stream. In these and other embodiments, the transcription and the video stream may not be combined, but may be passed together to the television 660.

In some embodiments, the adapter device 650 may be configured to stop relaying the video stream to the television 660 in response to receiving transcript data from the device 610. In these and other embodiments, the adapter device 650 may be configured to send a transcription to the television 660 for display in place of the video stream. As a result, the television 660 may display the transcription without the video stream. In some embodiments, the adapter device 650 may buffer the video stream while the television 660 is presenting the transcription. In these and other embodiments, the adapter device 650 may be controlled through the device 610, which may receive commands from a different device, to control the buffered video stream. As a result, the buffered video stream may be played back after the communication session.

In some embodiments, the adapter device 650 may be configured to provide the transcription of transcript data when no video stream is being provided to the television 660. In these and other embodiments, the adapter device 650 may send the transcription to the television 660 without combining the transcription with a video stream.

In some embodiments, a number of pixels used by the transcription of a total number of pixels of the television 660 may be adjusted based on whether the transcription is being combined with a video stream. For example, when the transcription is combined with a video stream, the transcription may cover a first portion of the pixels of the video stream so that the transcription covers a first portion of the television 660. When the transcription is not combined with a video stream, the transcription may cover a second portion of pixels in a stream provided to the television 660 so that the transcription covers a second portion of the television 660. In these and other embodiments, the first portion of the pixels may be less than the second portion of the pixels and the first portion of the television 660 may be less than the second portion of the television 660. For example, the first portion may be less than ten, twenty, thirty, or fifty percent and the second portion may be more than thirty, forty, fifty, seventy, or eighty-five percent. For example, when the transcription is combined with a video stream, by way of example, twenty words of the transcription may be displayed at one time. In contrast, when the transcription is not combined with a video stream, by way of example, fifty words of the transcription may be displayed at one time.

Alternatively or additionally, a font size of the transcription may be adjusted based on whether the transcription is combined with a video stream. For example, the font size of the transcription may be increased when the transcription is not combined with the video stream. In these and other embodiments, a number of words of the transcription displayed at one time may be the same whether the transcription is combined or is not combined with the video stream.

In some embodiments, the adapter device 650 may be configured to control the television 660. For example, the adapter device 650 may issue commands to the television 660 that may include turning on, coming to an awake state from a sleep state, adjusting display settings, such as contrast and brightness, and adjusting volume levels, among other commands.

For example, when the television 660 is not displaying images, in response to an indication from the device 610, the adapter device 650 may issue a command to the television 660 to turn-on. In these and other embodiments, the television 660 may not be displaying images because the television 660 is turned-off, in a sleep or hibernating state, or otherwise not displaying images.

The indication from the device 610 provided to the adapter device 650 may include the transcript data. Alternatively or additionally, the indication from the device 610 may be in response to the device 610 establishing a communication session before local or remote audio is received during the communication session that may result in transcript data. Alternatively or additionally, the indication from the device 610 may be in response to the device 610 providing audio to a transcription system when the device 610 is prepared to direct transcription data to the television 660. In these and other embodiments, directing the television to come to a state ready to display images before transcript data is received by the adapter device 650 may help to ensure that a transcription of the transcript data may be provided to the television 660 and presented to a user without a portion of the transcription not being displayed as the television 660 is preparing to display images. Alternatively or additionally, the adapter device 650 may buffer the transcription as the adapter device 650 waits for the television 660 to be prepared to display images.

The adapter device 650 may be further configured to control a volume level of the television 660. In these and other embodiments, the adapter device 650 may adjust a volume level of the television 660, such as decreasing a volume level of the television 660, in response to an indication from the device 610. In some embodiments, the volume level may be decreased such that the volume level is muted. The device 610 may be configured to send an indication to the adapter device 650 in response to receiving a communication request, establishing a communication session, obtaining audio, sending audio to a transcription system, or obtaining transcript data, among others.

In some embodiments, an adjustment of the volume level of the television 660 may depend on other networked devices that are participating in a communication session directed by the device 610. For example, when a first networked device is participating in a communication session, the device 610 may indicate to the adapter device 650 to adjust the television to a first volume level. In contrast, when a second networked device is participating in a communication session, the device 610 may indicate to the adapter device 650 to adjust the television to a second volume level that is different than the first volume level. For example, the volume level of the television when the first networked device is a mobile phone may be higher than the volume level of the television when the first networked device is a tablet. In these and other embodiments, a location of a networked device participating in a communication session in relation to the location of the television 660 may result in an adjustment of the volume level of the television 660. Alternatively or additionally, an adjustment of the display settings of the television 660 may depend on other networked devices that are participating in a communication session directed by the device 610.

In some embodiments, an adjustment of font size of a transcription displayed by the television 660 may depend on other networked devices that are participating in a communication session directed by the device 610. For example, when a first networked device is participating in the communication session, the transcription may be configured with a larger font size than when a second networked device is participating in the communication session.

In some embodiments, the networked devices that result in the transcription having a larger font size may be selected based on a location of the networked devices in relation to the television 660 as determined by the device 610. In these and other embodiments, the device 610 may determine a location of a networked device based on a wireless network communication, signal strength over wireless or wired networks, and user input, among others. Alternatively or additionally, the networked devices that result in the transcription having a larger font size may be selected based on a user assigned to a networked device participating in the communication session. For example, a user of a hearing-aid networked device that is registered with the device 610 and participating in the communication session may have worse eyesight than a user of another networked device that is registered with the device 610. Thus, when the hearing-aid networked device is participating in the communication session, the transcription may be displayed in a larger font size. Alternatively or additionally, the device 610 may determine that a user is using a networked device and is participating in a communication session based on voice characteristics and log-in information obtained by the networked device, such as user-ID, biometrics, etc. Based on a user using a networked device participating in the communication session, the font size of the transcription may be larger or smaller. In these and other embodiments, the device 610 and/or the adapter device 650 may automatically adjust the volume, font size, display settings, and other configurations based on the networked devices participating in a communication session without input from a user.

In some embodiments, the adapter device 650 may receive audio of a communication session from the device 610. In these and other embodiments, the adapter device 650 may send the audio to the television 660 to be broadcast by the television. In some embodiments, the first cable 670 may already be providing audio to the television 660 as received over the first cable 670. In these and other embodiments, the adapter device 650 may be configured to exchange the audio received from the first cable 670 with the audio received by the device 610 and send the audio from the device 610 to the television 660. As a result, the audio broadcast by the television 660 may not correspond with the video stream displayed by the television 660 but with the transcription displayed by the television 660.

Modifications, additions, or omissions may be made to the environment 600 without departing from the scope of the present disclosure. For example, in some embodiments, the environment 600 may not include the adapter device 650. In these and other embodiments, the device 610 may perform the operations of the adapter device 650 and be directly coupled with the television over a wired or wireless connection, such as a 802.11 connection, a HDMI connection, or some other connection. In these and other embodiments, the device 610 may direct the television 660 to display a transcription. Alternatively or additionally, some of the operations performed by the adapter device 650 may be performed by the television 650 and others of the operations may be performed by the device 610. For example, the device 610 may send commands to the television 610 and the television 610 may combine the transcription with a video signal to display on the television 610.

Figure 7:
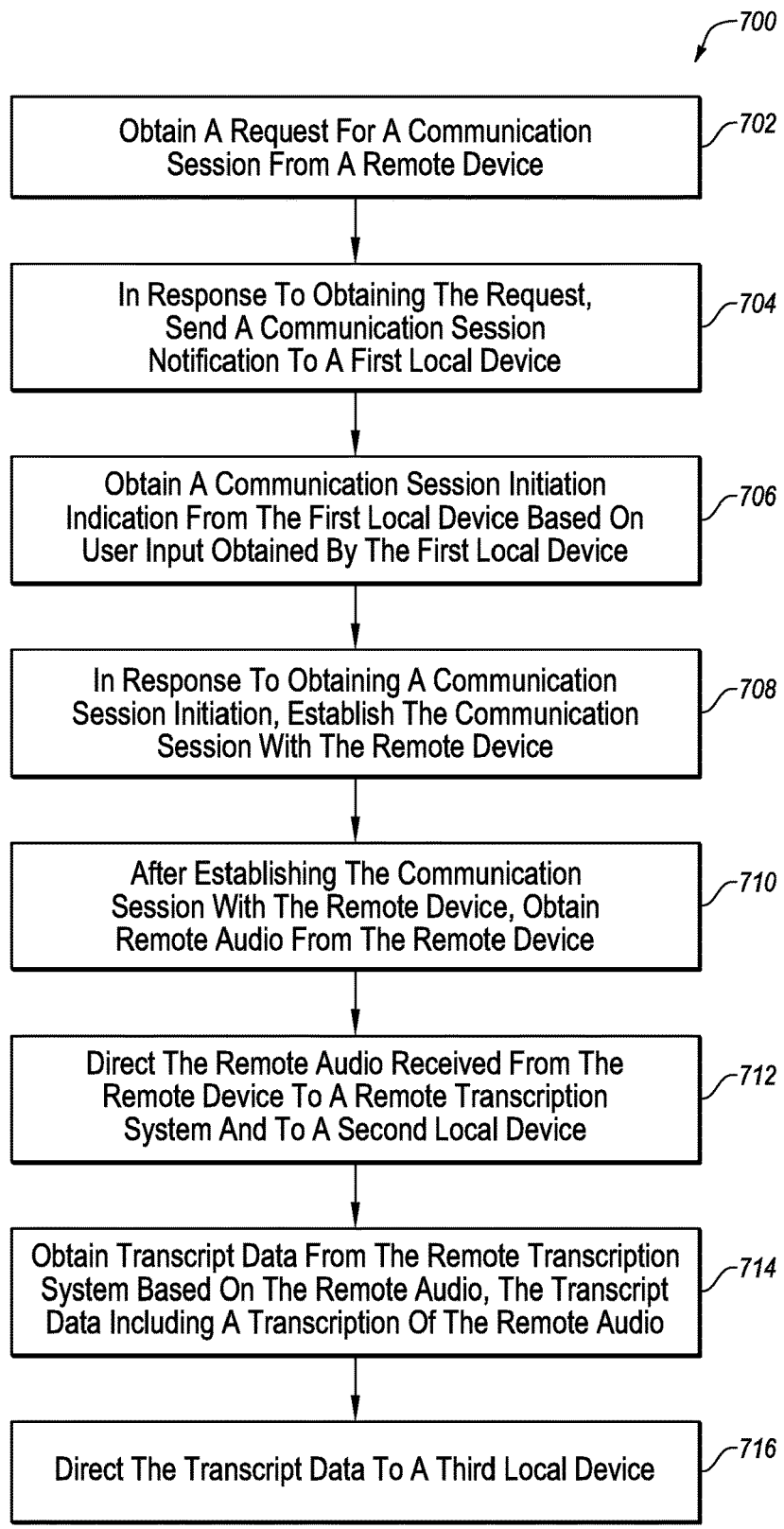
FIG. 7 illustrates an example method to present transcripts of a communication.

FIG. 7 is a flowchart of another example method 700 to present transcripts of a communication. The method 700 may be arranged in accordance with at least one embodiment described in the present disclosure. The method 700 may be performed, in some embodiments, by a device or system, such as the device 110, the device 200, the device 310, and/or the device 510, or another device. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 700 may begin at block 702, where a request for a communication session may be obtained from a remote device. At block 704, in response to obtaining the request, a communication session notification may be sent to a first local device.

At block 706, a communication session initiation indication may be obtained from the first local device based on user input obtained by the first local device. In some embodiments, the user input may be in response to the communication session notification. At block 708, in response to obtaining a communication session initiation, the communication session may be established with the remote device.

At block 710, after establishing the communication session with the remote device, remote audio may be obtained from the remote device. At block 712, the remote audio received from the remote device may be directed to a remote transcription system and to a second local device.

At block 714, transcript data may be obtained from the remote transcription system based on the remote audio. The transcript data may include a transcription of the remote audio. At block 716, the transcript data may be directed to a third local device. In some embodiments, the transcript data is only directed to the third local device such that it is not directed to the second local device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 700 may further include obtaining first audio from a fourth local device that does not obtain the transcript data and directing the first audio to the remote device as part of the communication session with the remote device.

In some embodiments, the method 700 may further include directing the first audio obtained from the fourth local device to the second local device. Alternatively or additionally, the method 700 may include obtaining second audio from one or more of: the first local device, the second local device, and the third local device and directing the second audio to the remote device as part of the communication session with the remote device.

In some embodiments, the communication session may be a video communication session. In these and other embodiments, the method 700 may further include, after establishing the communication session with the remote device, obtaining remote video from the remote device and directing the remote video to the second local device.

Figure 8:
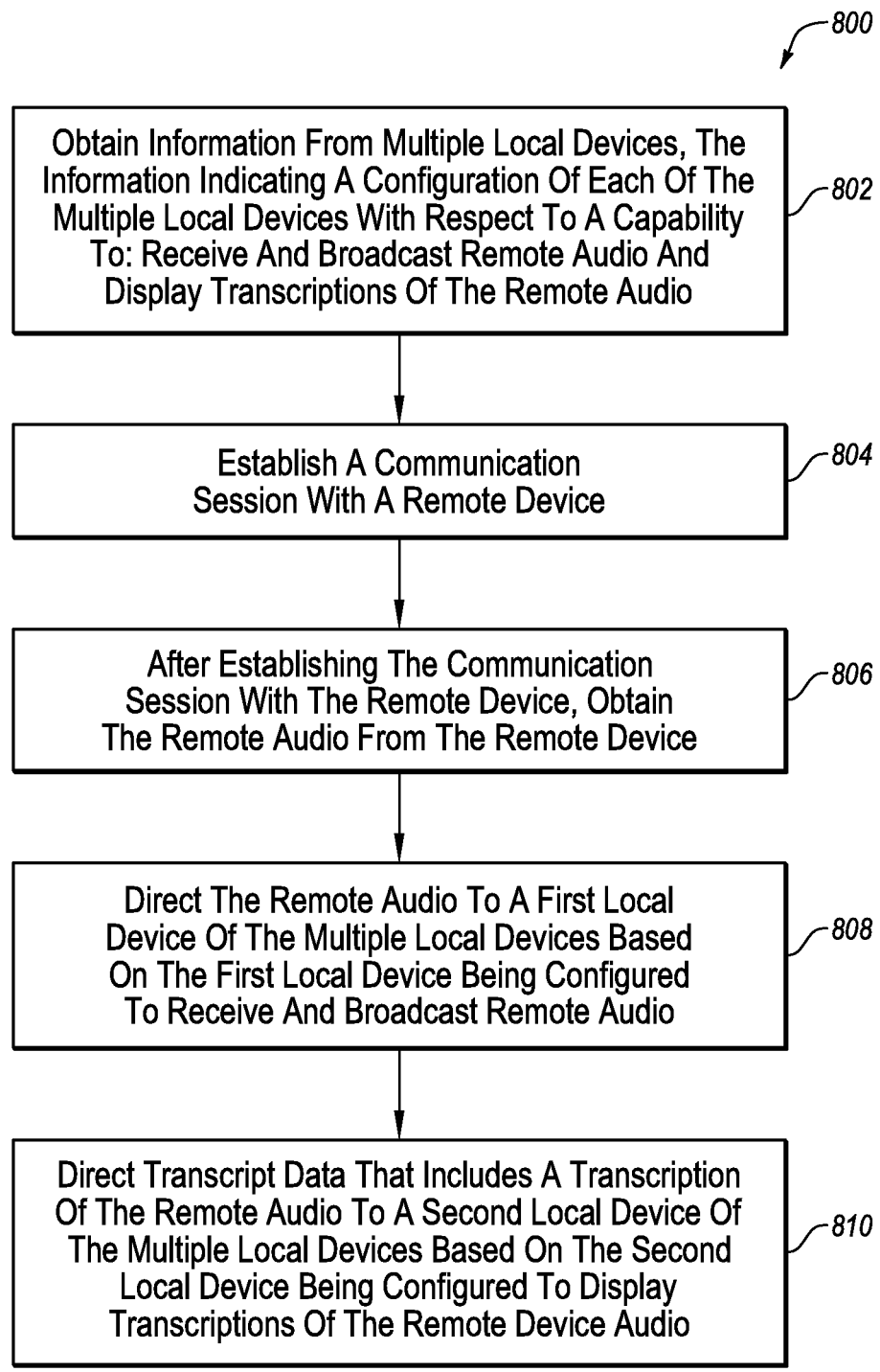
FIG. 8 illustrates another example method to present transcripts of a communication.

FIG. 8 is a flowchart of another example method 800 to present transcripts of a communication. The method 800 may be arranged in accordance with at least one embodiment described in the present disclosure. The method 800 may be performed, in some embodiments, by a device or system, such as the device 110, the device 200, the device 310, and/or the device 510, or another device. In these and other embodiments, the method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 800 may begin at block 802, where information from multiple local devices may be obtained. The information may indicate a configuration of each of the multiple local devices with respect to a capability to: receive and broadcast remote audio and display transcriptions of the remote audio.

At block 804, a communication session may be established with a remote device. At block 806, after establishing the communication session with the remote device, the remote audio may be obtained from the remote device.

At block 808, the remote audio may be directed to a first local device of the multiple local devices based on the first local device being configured to receive and broadcast remote audio. In some embodiments, the first local device being configured to receive and broadcast the remote audio may be indicated by information obtained about the first local device at block 802.

At block 810, transcript data that includes a transcription of the remote audio may be directed to a second local device of the multiple local devices based on the second local device being configured to display transcriptions of the remote device audio. In some embodiments, the first local device may not be configured to display transcriptions of the remote device audio such that the transcript data is not directed to the first local device. In some embodiments, the first local device not being configured to display transcriptions may be indicated by information obtained about the first local device at block 802. Additionally or alternatively, the configurations of the second local device with respect to receiving or presenting audio or transcription data may be indicated by information obtained about the second local device at block 802.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 800 may further include directing the remote audio received from the remote device to a remote transcription system and obtaining the transcript data from the remote transcription system based on the remote audio.

Alternatively or additionally, the method 800 may further include detecting the multiple local devices and after detecting the multiple local devices, establishing a network connection with each of the multiple local devices. In these and other embodiments, the information indicating the configuration of each of the multiple local devices may be obtained after establishing a network connection with each of the multiple local devices.

In some embodiments, the communication session may be a video communication session and the information may indicate that a configuration of each of the multiple local devices with respect to a capability to: receive and broadcast remote audio, receive and display remote video, and display transcriptions of the remote device audio. In these and other embodiments, the method 800 may further include after establishing the communication session with the remote device, obtaining remote video from the remote device and directing the remote video to the second local device based on the second local device being configured to receive and display remote video.

In some embodiments, the information may indicate that a configuration of each of the multiple local devices with respect to a capability to: receive and broadcast remote audio, receive and transmit local audio, and display transcriptions of the remote device audio. In these and other embodiments, the method 800 may further include after establishing the communication session with the remote device, obtaining local audio from a third local device of the multiple local devices that is configured to receive and transmit local audio and directing the local audio to the remote device.

Figure 9:
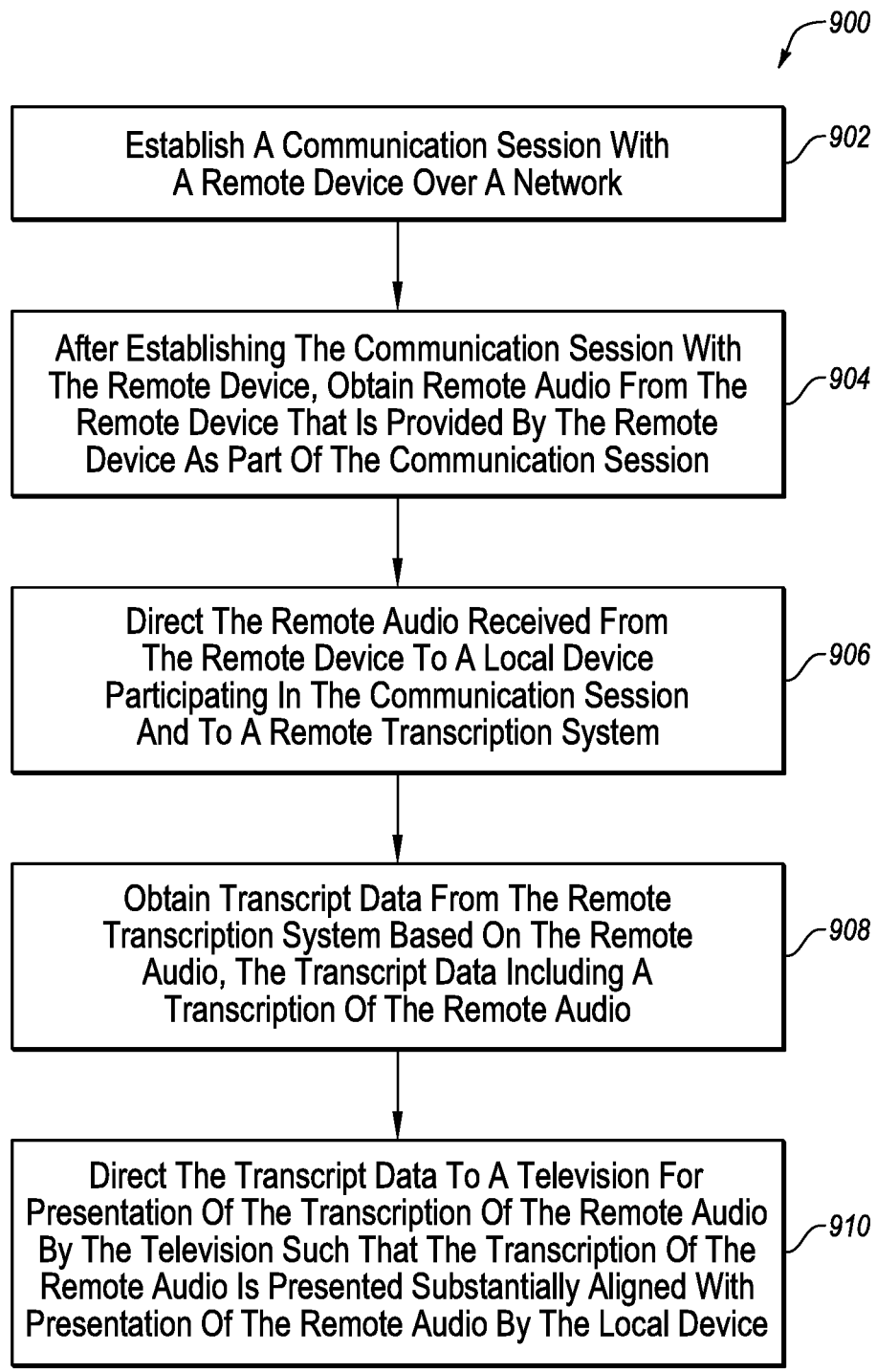
FIG. 9 illustrates another example method to present transcripts of a communication.

FIG. 9 is a flowchart of another example method 900 to present transcripts of a communication. The method 900 may be arranged in accordance with at least one embodiment described in the present disclosure. The method 900 may be performed, in some embodiments, by a device or system, such as the device 110, the device 200, the device 310, and/or the device 510, or another device. In these and other embodiments, the method 900 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 900 may begin at block 902, where a communication session with a remote device may be established over a network. In some embodiments, the network may be selected from a group including: a cellular network, a public switched telephone network, and an Internet Protocol (IP) network.

At block 904, after establishing the communication session with the remote device, remote audio may be obtained from the remote device that is provided by the remote device as part of the communication session.

At block 906, the remote audio received from the remote device may be directed to a local device participating in the communication session and to a remote transcription system. At block 908, transcript data may be obtained from the remote transcription system based on the remote audio. The transcript data may include a transcription of the remote audio.

At block 910, the transcript data may be directed to a television for presentation of the transcription of the remote audio by the television such that the transcription of the remote audio is presented substantially aligned with presentation of the remote audio by the local device. In these and other embodiments, the transcript data may be directed to the television by way of an adapter device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 900 may further include combining the transcript data with a television video stream and providing the combined transcript data and television video stream to the television to present the transcription of the remote audio. In these and other embodiments, combining the transcript data and the television video stream may include overlaying the transcription of the remote audio on the television video stream.

In some embodiments, the method 900 may further include in response to directing the transcript data to a television, reducing a level of television audio output by the television. Alternatively or additionally, the method 900 may further include in response to directing the transcript data to the television, directing the television to come to an awake state.

In some embodiments, the method 900 may further include obtaining local audio from the local device and directing the local audio to the remote device over the network.

Figure 10:
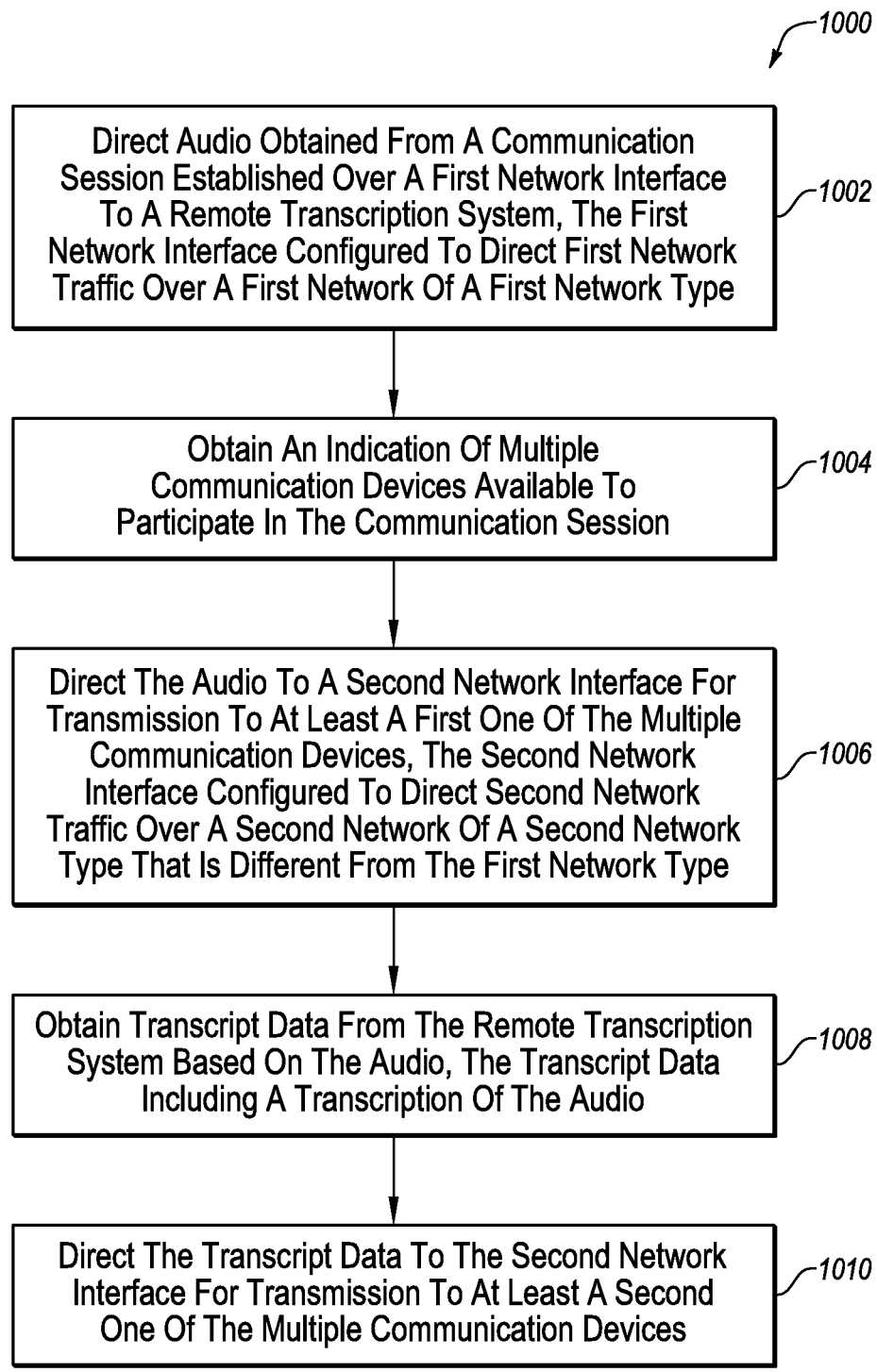
FIG. 10 illustrates another example method to present transcripts of a communication.

FIG. 10 is a flowchart of another example method 1000 to present transcripts of a communication. The method 1000 may be arranged in accordance with at least one embodiment described in the present disclosure. The method 1000 may be performed, in some embodiments, by a device or system, such as the device 110, the device 200, the device 310, and/or the device 510, or another device. In these and other embodiments, the method 1000 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 1000 may begin at block 1002, where audio, obtained from a communication session established over a first network interface, may be directed to a remote transcription system. The first network interface may be configured to direct first network traffic over a first network of a first network type.

At block 1004, an indication of multiple communication devices available to participate in the communication session may be obtained. In some embodiments, the communication session may be a video communication session.

At block 1006, the audio may be directed to a second network interface for transmission to at least a first one of the multiple communication devices. The second network interface may be configured to direct second network traffic over a second network of a second network type that is different from the first network type.

In some embodiments, the first network may be a public switched telephone network and the second network may be a local wireless network. Alternatively or additionally, the first network may be a cellular network and the second network may be a local wireless network. Alternatively or additionally, the first network may be an Internet Protocol (IP) network and the second network may be a local wireless network.

In some embodiments, the audio may be directed to the remote transcription system over a third network of a third network type that is different from the first network type and the second network type.

At block 1008, transcript data from the remote transcription system based on the audio may be obtained. The transcript data may include a transcription of the audio.

At block 1010, the transcript data may be directed to the second network interface for transmission to at least a second one of the multiple communication devices.

In some embodiments, the first one of the multiple communication devices and the second one of the multiple communication devices may be one of the following: a television, a set-top box, a smart phone, a tablet, a personal health care device, and a telephone console, among other devices.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 1000 may further include obtaining second audio from a second communication session separate from the communication session over the first network interface and directing the second audio to the remote transcription system. The method 1000 may also include obtaining a second indication of second multiple communication devices available to participate in the second communication session and directing the second audio to the second network interface for transmission to at least a first one of the second multiple communication devices. The first one of the second multiple communication devices may be different than the first one of the multiple communication devices.

The method 1000 may also include obtaining second transcript data from the remote transcription system of the second audio. The second transcript data may include a transcription of the second audio. The method 1000 may further include directing the second transcript data to the second network interface for transmission to at least a second one of the second multiple communication devices. In some embodiments, the second one of the multiple communication devices may be different than the second one of the second multiple communication devices.

As indicated above, the embodiments described herein may include the use of a special purpose or general purpose computer (e.g., the processor 210 of FIG. 2) including various computer hardware or software modules, as discussed in greater detail below. Further, as indicated above, embodiments described herein may be implemented using computer-readable media (e.g., the memory 212 of FIG. 2) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to provide transcripts of a communication, the method comprising:
   obtaining, at a device associated with a user, a request for a communication session from a remote device;
   in response to obtaining the request, sending, from the device, a communication session notification to a first local device associated with the user;
   obtaining, at the device, a communication session initiation indication for the communication session from the first local device based on user input of the user obtained by the first local device;
   in response to obtaining the communication session initiation indication, establishing the communication session with the remote device;
   after establishing the communication session with the remote device, obtaining, at the device, remote audio of the communication session from the remote device;
   directing, from the device and during the communication session, the remote audio received from the remote device to a remote transcription system and to a second local device associated with the user;
   obtaining, at the device, transcript data from the remote transcription system based on the remote audio, the transcript data including a transcription of the remote audio; and
   directing, from the device and during the communication session, the transcript data to a third local device associated with the user.

2. The method of claim 1, further comprising:
   obtaining first audio of the communication session from a fourth local device associated with the user that does not obtain the transcript data; and
   directing the first audio to the remote device as part of the communication session with the remote device.

3. The method of claim 2, further comprising directing the first audio obtained from the fourth local device to the second local device.

4. The method of claim 1, wherein the transcript data is not directed to the second local device.

5. The method of claim 1, further comprising:
   obtaining second audio from one or more of: the first local device, the second local device, and the third local device; and
   directing the second audio to the remote device as part of the communication session with the remote device.

6. The method of claim 1, wherein the communication session is a video communication session and the method further comprises:
   after establishing the communication session with the remote device, obtaining remote video from the remote device; and
   directing the remote video to the second local device.

7. A system that includes at least one non-transitory computer-readable media configured to store one or more instructions that, in response to being executed by one or more processors, cause the system to perform the method of claim 1.

8. A method to provide transcripts of a communication, the method comprising:
   obtaining, at a device associated with a user, information from a plurality of local devices each associated with the user, the information indicating a configuration of each of the plurality of local devices with respect to a capability to: receive and broadcast remote audio and display transcriptions of the remote audio;
   establishing a communication session with a remote device;
   after establishing the communication session with the remote device, obtaining, at the device, the remote audio of the communication session from the remote device;
   directing, from the device during the communication session, the remote audio to a first local device of the plurality of local devices based on the first local device being configured to receive and broadcast remote audio; and
   directing, from the device during the communication session, transcript data that includes a transcription of the remote audio to a second local device of the plurality of local devices based on the second local device being configured to display transcriptions of the remote device audio.

9. The method of claim 8, further comprising:
directing the remote audio received from the remote device to a remote transcription system; and
obtaining the transcript data from the remote transcription system based on the remote audio.

10. The method of claim 8, wherein the first local device is not configured to display transcriptions of the remote device audio such that the transcript data is not directed to the first local device.

11. The method of claim 8, wherein the communication session is a video communication session and the information indicates the configuration of each of the plurality of local devices with respect to a capability to: receive and broadcast remote audio, receive and display remote video, and display transcriptions of the remote device audio, and the method further comprises:
after establishing the communication session with the remote device, obtaining remote video from the remote device; and
directing the remote video to the second local device based on the second local device being configured to receive and display remote video.

12. The method of claim 8, wherein the information indicates the configuration of each of the plurality of local devices with respect to a capability to: receive and broadcast remote audio, receive and transmit local audio, and display transcriptions of the remote device audio, and the method further comprises:
after establishing the communication session with the remote device, obtaining local audio from a third local device of the plurality of local devices that is configured to receive and transmit local audio; and
directing the local audio to the remote device.

13. The method of claim 8, further comprising:
detecting the plurality of local devices; and
after detecting the plurality of local devices, establishing a network connection with each of the plurality of local devices, wherein the information indicating the configuration of each of the plurality of local devices is obtained after establishing the network connection with each of the plurality of local devices.

14. A system that includes at least one non-transitory computer-readable media configured to store one or more instructions that, in response to being executed by one or more processors, cause the system to perform the method of claim 8.

15. A device comprising:
one or more computer-readable media configured to store instructions; and
at least one processor communicatively coupled to the computer-readable media, the at least one processor configured to execute the instructions to cause the device to perform operations, the operations comprising:
obtain, at the device, which is associated with a user, information from a plurality of local devices each associated with the user, the information indicating a configuration of each of the plurality of local devices with respect to a capability to: receive and broadcast remote audio and display transcriptions of the remote audio;
establish a communication session between the device and a remote device;
after establishing the communication session with the remote device, obtain, at the device, the remote audio of the communication session from the remote device;
direct, from the device, the remote audio of the communication session to a first local device of the plurality of local devices based on the first local device being configured to receive and broadcast remote audio; and
direct, from the device, transcript data that includes a transcription of the remote audio of the communication session to a second local device of the plurality of local devices based on the second local device being configured to display transcriptions of the remote device audio.

16. The device of claim 15, wherein the operations further comprise:
direct the remote audio received from the remote device to a remote transcription system; and
obtain the transcript data from the remote transcription system based on the remote audio.

17. The device of claim 15, wherein the first local device is not configured to display transcriptions of the remote device audio such that the transcript data is not directed to the first local device.

18. The device of claim 15, wherein the communication session is a video communication session and the information indicates the configuration of each of the plurality of local devices with respect to a capability to: receive and broadcast remote audio, receive and display remote video, and display transcriptions of the remote device audio, and the operations further comprise:
after establishing the communication session with the remote device, obtain remote video from the remote device; and
direct the remote video to the second local device based on the second local device being configured to receive and display remote video.

19. The device of claim 15, wherein the information indicates the configuration of each of the plurality of local devices with respect to a capability to: receive and broadcast remote audio, receive and transmit local audio, and display transcriptions of the remote device audio, and the operations further comprise:
after establishing the communication session with the remote device, obtain local audio from a third local device of the plurality of local devices that is configured to receive and transmit local audio; and
direct the local audio to the remote device.

20. The device of claim 15, wherein the operations further comprise: detect the plurality of local devices; and
after detecting the plurality of local devices, establish a network connection with each of the plurality of local devices, wherein the information indicating the configuration of each of the plurality of local devices is obtained after establishing the network connection with each of the plurality of local devices.

* * * * *

UNITED STATES PATENT AND TRADEMARK OFFICE
CERTIFICATE OF CORRECTION

PATENT NO. : 10,332,521 B2  
APPLICATION NO. : 15/782719  
DATED : June 25, 2019  
INVENTOR(S) : Michael Holm and Jasper C. Pan Page 1 of 1

It is certified that error appears in the above-identified patent and that said Letters Patent is hereby corrected as shown below:

On the Title Page

Item (60): please insert priority claim --"U.S. Application No. 62/407,302 filed October 12, 2016"--

Signed and Sealed this  
Sixth Day of August, 2019

Andrei Iancu  
*Director of the United States Patent and Trademark Office*